(12) United States Patent
Fisher et al.

(10) Patent No.: US 8,374,948 B2
(45) Date of Patent: *Feb. 12, 2013

(54) SYSTEM AND METHOD FOR RECEIVING A BID

(75) Inventors: Alan S. Fisher, Pleasanton, CA (US); Samuel Jerrold Kaplan, Hillsborough, CA (US)

(73) Assignee: eBay Inc., San Jose, CA (US)

( * ) Notice: Subject to any disclaimer, the term of this patent is extended or adjusted under 35 U.S.C. 154(b) by 522 days.

This patent is subject to a terminal disclaimer.

(21) Appl. No.: 11/963,094

(22) Filed: Dec. 21, 2007

(65) Prior Publication Data

US 2008/0103938 A1    May 1, 2008

Related U.S. Application Data

(63) Continuation of application No. 10/319,868, filed on Dec. 13, 2002, which is a continuation of application No. 09/706,849, filed on Nov. 7, 2000, which is a continuation of application No. 08/624,259, filed on Mar. 29, 1996, now Pat. No. 6,243,691.

(51) Int. Cl.
*G06Q 40/00* (2012.01)

(52) U.S. Cl. ............................................. 705/37

(58) Field of Classification Search .................. None
See application file for complete search history.

(56) References Cited

U.S. PATENT DOCUMENTS

| | | | |
|---|---|---|---|
| 219,230 A | 9/1879 | Dennis | |
| 3,573,747 A | 4/1971 | Adams et al. | |
| 3,581,072 A | 5/1971 | Nymeyer | |
| 4,071,697 A | 1/1978 | Bushnell | |
| 4,319,336 A | 3/1982 | Anderson et al. | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,845,625 A | 7/1989 | Stannard | |
| 4,864,516 A | 9/1989 | Gaither et al. | |
| 4,903,201 A | 2/1990 | Wagner | |
| 4,974,252 A | 11/1990 | Osborne | |
| 4,992,940 A | 2/1991 | Dworkin | |
| 5,047,959 A * | 9/1991 | Phillips et al. | ................ 715/853 |
| 5,063,507 A | 11/1991 | Lindsey et al. | |

(Continued)

FOREIGN PATENT DOCUMENTS

| | | |
|---|---|---|
| FR | 2658635 | 8/1991 |
| NL | 9300266 | 2/1993 |

(Continued)

OTHER PUBLICATIONS

Orla, S., "Servicing rights, mortgage banks to be sold at live auctions"; National Mortgage News, NY: Feb. 20, 1995.*

(Continued)

*Primary Examiner* — Olabode Akintola
(74) *Attorney, Agent, or Firm* — Schwegman Lundberg & Woessner, P.A.

(57) ABSTRACT

An electronic auction system may include a bid validator connected between a network, a bid database and a merchandise catalog page. The example bid validator may receive over the network, bid information via an electronic mail message and further bid information via a web-based bid form. The example bid validator may validate the bid information and the further bid information before placing a bid and a further bid respectively into the bid database. The example bid validator may then update the web-based merchandise catalog page based on the bid and the further bid.

6 Claims, 12 Drawing Sheets

U.S. PATENT DOCUMENTS

| | | | |
|---|---|---|---|
| 5,077,665 | A | 12/1991 | Silverman et al. |
| 5,101,353 | A | 3/1992 | Lupien et al. |
| 5,136,501 | A | 8/1992 | Silverman et al. |
| 5,146,403 | A | 9/1992 | Goodman |
| 5,168,446 | A | 12/1992 | Wiseman |
| 5,205,200 | A | 4/1993 | Wright |
| 5,222,236 | A | 6/1993 | Potash et al. |
| 5,243,515 | A | 9/1993 | Lee |
| 5,258,908 | A | 11/1993 | Hartheimer et al. |
| 5,280,422 | A | 1/1994 | Moe et al. |
| 5,297,031 | A | 3/1994 | Gutterman et al. |
| 5,297,032 | A | 3/1994 | Trojan et al. |
| 5,305,200 | A | 4/1994 | Hartheimer et al. |
| 5,310,997 | A | 5/1994 | Roach et al. |
| 5,317,683 | A | 5/1994 | Hager et al. |
| 5,325,297 | A | 6/1994 | Bird et al. |
| 5,329,589 | A | 7/1994 | Fraser et al. |
| 5,369,763 | A | 11/1994 | Biles |
| 5,375,055 | A | 12/1994 | Togher et al. |
| 5,394,324 | A | 2/1995 | Clearwater |
| 5,426,281 | A | 6/1995 | Abecassis |
| 5,428,778 | A | 6/1995 | Brookes |
| 5,485,510 | A | 1/1996 | Colbert |
| 5,553,145 | A | 9/1996 | Micali |
| 5,557,728 | A | 9/1996 | Garrett et al. |
| 5,598,557 | A | 1/1997 | Doner et al. |
| 5,629,982 | A | 5/1997 | Micali |
| 5,640,569 | A | 6/1997 | Miller et al. |
| 5,657,389 | A | 8/1997 | Houvener |
| 5,664,111 | A | 9/1997 | Nahan et al. |
| 5,664,115 | A | 9/1997 | Fraser |
| 5,689,652 | A | 11/1997 | Lupien et al. |
| 5,694,546 | A | 12/1997 | Reisman |
| 5,706,457 | A | 1/1998 | Dwyer et al. |
| 5,710,889 | A | 1/1998 | Clark et al. |
| 5,715,314 | A | 2/1998 | Payne et al. |
| 5,715,402 | A | 2/1998 | Popolo |
| 5,717,989 | A | 2/1998 | Tozzoli et al. |
| 5,727,165 | A | 3/1998 | Ordish et al. |
| 5,760,917 | A | 6/1998 | Sheridan |
| 5,761,655 | A | 6/1998 | Hoffman |
| 5,771,291 | A | 6/1998 | Newton et al. |
| 5,771,380 | A | 6/1998 | Tanaka et al. |
| 5,774,873 | A | 6/1998 | Berent et al. |
| 5,778,367 | A | 7/1998 | Wesinger, Jr. et al. |
| 5,790,790 | A | 8/1998 | Smith et al. |
| 5,794,219 | A * | 8/1998 | Brown ............... 705/37 |
| 5,799,285 | A | 8/1998 | Klingman |
| 5,803,500 | A | 9/1998 | Mossberg |
| 5,818,914 | A | 10/1998 | Fujisaki |
| 5,826,244 | A * | 10/1998 | Huberman ............... 705/37 |
| 5,835,896 | A | 11/1998 | Fisher et al. |
| 5,845,265 | A * | 12/1998 | Woolston ............... 705/37 |
| 5,845,266 | A | 12/1998 | Lupien et al. |
| 5,848,139 | A | 12/1998 | Grover |
| 5,850,442 | A | 12/1998 | Muftic |
| 5,872,848 | A | 2/1999 | Romney et al. |
| 5,873,069 | A | 2/1999 | Reuhl et al. |
| 5,884,056 | A | 3/1999 | Steele |
| 5,890,138 | A | 3/1999 | Godin et al. |
| 5,905,975 | A | 5/1999 | Ausubel |
| 5,922,074 | A | 7/1999 | Richard et al. |
| 5,963,915 | A | 10/1999 | Kirsch |
| 6,006,201 | A | 12/1999 | Berent et al. |
| 6,026,383 | A * | 2/2000 | Ausubel ............... 705/37 |
| 6,034,652 | A | 3/2000 | Freiberger et al. |
| 6,035,402 | A | 3/2000 | Vaeth et al. |
| 6,047,264 | A | 4/2000 | Fisher et al. |
| 6,058,379 | A | 5/2000 | Odom et al. |
| 6,085,176 | A | 7/2000 | Woolston |
| 6,104,815 | A | 8/2000 | Alcorn et al. |
| 6,119,137 | A | 9/2000 | Smith et al. |
| 6,161,099 | A | 12/2000 | Harrington et al. |
| 6,178,408 | B1 | 1/2001 | Copple et al. |
| 6,192,407 | B1 | 2/2001 | Smith et al. |
| 6,202,051 | B1 | 3/2001 | Woolston |
| 6,243,691 | B1 | 6/2001 | Fisher et al. |
| 6,266,651 | B1 | 7/2001 | Woolston |
| 6,266,652 | B1 | 7/2001 | Godin et al. |
| 6,338,050 | B1 | 1/2002 | Conklin et al. |
| 6,415,270 | B1 | 7/2002 | Rackson et al. |
| 6,430,545 | B1 | 8/2002 | Honarvar et al. |
| 6,449,601 | B1 | 9/2002 | Friedland et al. |
| 6,499,018 | B1 | 12/2002 | Alaia et al. |
| 6,609,112 | B1 | 8/2003 | Boarman et al. |
| 6,691,094 | B1 | 2/2004 | Herschkorn |
| 6,871,190 | B1 | 3/2005 | Seymour et al. |
| 7,003,485 | B1 | 2/2006 | Young |
| 7,133,835 | B1 * | 11/2006 | Fusz et al. ............... 705/26.3 |
| 7,395,238 | B2 | 7/2008 | Alaia et al. |
| 7,461,022 | B1 | 12/2008 | Churchill et al. |
| 7,783,555 | B2 | 8/2010 | Watt, II et al. |
| 7,853,486 | B2 | 12/2010 | Grove et al. |
| 7,870,055 | B2 | 1/2011 | Fisher et al. |
| 7,904,346 | B2 | 3/2011 | Grove et al. |
| 7,983,977 | B2 | 7/2011 | Fisher et al. |
| 8,015,103 | B2 | 9/2011 | Watt et al. |
| 2001/0027436 | A1 | 10/2001 | Tenembaum |
| 2001/0032175 | A1 | 10/2001 | Holden et al. |
| 2001/0037278 | A1 | 11/2001 | Messmer et al. |
| 2002/0161691 | A1 | 10/2002 | Nishi |
| 2002/0169710 | A1 | 11/2002 | Morimoto |
| 2002/0198814 | A1 | 12/2002 | Bansal |
| 2003/0208408 | A1 | 11/2003 | Garg et al. |
| 2003/0236739 | A1 | 12/2003 | Borgeson et al. |
| 2004/0128224 | A1 | 7/2004 | Dabney et al. |
| 2005/0022115 | A1 | 1/2005 | Baumgartner et al. |
| 2005/0033648 | A1 | 2/2005 | Jin et al. |
| 2005/0131809 | A1 | 6/2005 | Watt, II et al. |
| 2007/0106571 | A1 | 5/2007 | Grove et al. |
| 2007/0112644 | A1 | 5/2007 | Grove et al. |
| 2008/0097896 | A1 | 4/2008 | Fisher et al. |
| 2010/0257087 | A1 | 10/2010 | Watt et al. |
| 2011/0270738 | A1 | 11/2011 | Watt, II et al. |

FOREIGN PATENT DOCUMENTS

| | | |
|---|---|---|
| WO | WO-9215174 A1 | 9/1992 |
| WO | WO-9634356 A1 | 10/1996 |
| WO | WO-9737315 A1 | 10/1997 |
| WO | WO-9918510 A1 | 8/1999 |
| WO | WO-9963461 A1 | 12/1999 |
| WO | WO-0032088 A1 | 11/2000 |
| WO | WO-2004061614 A2 | 7/2004 |
| WO | WO-2004061614 A3 | 7/2004 |

OTHER PUBLICATIONS

Kelly, S., "Jury Still Out on Treasury's Dutch Experiment", New Yourk, N.Y.: Apr. 29, 1993, vol. 304, Iss 29141 • p. A.*

American Law Institute, Draft—Uniform Commercial Code Revised Article 2 (Sales, Parts 2, 3 and 7), [Online]. Retrieved from the Internet: <URL: http://www.kentlaw.edu/ulc/uniform/uccart2/chap2/ucc2c237.html>, (Jan. 4, 1996), pp. 1-15.

Internet Presence, Inc. Newsgroup Posting Re: Announce: Internet ShopKeeper, (Aug. 2, 1994), 2 pgs.

"A Beginner's Guide to HTML", NCSA/pubs@ncsa.uiuc.edu, Appendix A, mailed to the USPTO Oct. 24, 1994, 11 pgs.

"Affinity Traders Online Business Plan", (Aug. 18, 1995), 29 pgs.

"AMIX Demo Screen Shots", Dan Bricklin's Demo 11 Computer Program, Sage Software, (Copyright 1990, 1991), 49 pgs.

"U.S. Appl. No. 08/624,259, Non-Final Office Action mailed Jan. 6, 1999", 5 pgs.

"U.S. Appl. No. 08/624,259, Non-Final Office Action mailed May 19, 1998", 6 pgs.

"U.S. Appl. No. 08/624,259, Non-Final Office Action mailed Nov. 30, 1999", 10 pgs.

"U.S. Appl. No. 08/624,259, Notice of Allowance mailed Mar. 26, 1999", 7 pgs.

"U.S. Appl. No. 08/624,259, Notice of Allowance mailed Jul. 6, 2000", 6 pgs.

"U.S. Appl. No. 08/624,259, Preliminary Amendment filed Aug. 8, 1996", 2 pgs.

"U.S. Appl. No. 08/624,259, Preliminary Amendment filed Sep. 10, 1999", 30 pgs.

"U.S. Appl. No. 08/624,259, Response filed Jan. 29, 1999 to Non-Final Office Action mailed Jan. 6, 1999", 2 pgs.
"U.S. Appl. No. 08/624,259, Response filed Feb. 23, 1999 to Non-Final Office Action mailed Jan. 25, 1999", 2 pgs.
"U.S. Appl. No. 08/624,259, Response filed Apr. 27, 2000 to Non-Final Office Action mailed Nov. 30, 1999", 7 pgs.
"U.S. Appl. No. 08/624,259, Response filed Aug. 19, 1998 to Non-Final Office Action mailed May 19, 1998", 6 pgs.
"U.S. Appl. No. 09/504,261, Advisory Action mailed Sep. 5, 2003", 3 pgs.
"U.S. Appl. No. 09/504,261, Appeal Brief filed Nov. 13, 2003", 15 pgs.
"U.S. Appl. No. 09/504,261, Appeal Brief mailed Jun. 28, 2010", 25 pgs.
"U.S. Appl. No. 09/504,261, Decision on Pre-Appeal Brief Request mailed May 24, 2010", 2 pgs.
"U.S. Appl. No. 09/504,261, Examiner Interview Summary mailed Jul. 6, 2006", 6 pgs.
"U.S. Appl. No. 09/504,261, Examiner's Answer to Appeal Brief mailed Jan. 27, 2004", 11 pgs.
"U.S. Appl. No. 09/504,261, Examiner's Answer to Appeal Brief mailed Oct. 1, 2010", 8 pgs.
"U.S. Appl. No. 09/504,261, Final Office Action mailed Jun. 23, 2003", 7 pgs.
"U.S. Appl. No. 09/504,261, Final Office Action mailed Nov. 27, 2009", 12 pgs.
"U.S. Appl. No. 09/504,261, Non Final Office Action mailed Feb. 26, 2003", 7 pgs.
"U.S. Appl. No. 09/504,261, Non Final Office Action mailed Apr. 16, 2009", 8 pgs.
"U.S. Appl. No. 09/504,261, Non Final Office Action mailed Sep. 25, 2002", 5 pgs.
"U.S. Appl. No. 09/504,261, Pre-Appeal Brief Request filed Mar. 29, 2010", 5 pgs.
"U.S. Appl. No. 09/504,261, Reply Brief filed Dec. 1, 2010", 9 pgs.
"U.S. Appl. No. 09/504,261, Response filed Jan. 23, 2003 to Non Final Office Action mailed Sep. 25, 2002", 22 pgs.
"U.S. Appl. No. 09/504,261, Response filed Jul. 16, 2009 to Non Final Office Action mailed Apr. 16, 2009", 10 pgs.
"U.S. Appl. No. 09/504,261, Response filed Aug. 19, 2003 to Final Office Action mailed Jun. 23, 2003", 13 pgs.
"U.S. Appl. No. 09/706,849 , Appeal Brief filed Dec. 1, 2010", 34 pgs.
"U.S. Appl. No. 09/706,849, Examiner Interview Summary mailed May 28, 2009", 2 pgs.
"U.S. Appl. No. 09/706,849, Final Office Action mailed Mar. 1, 2010", 12 pgs.
"U.S. Appl. No. 09/706,849, Final Office Action mailed Aug. 6, 2008", 10 pgs.
"U.S. Appl. No. 09/706,849, Final Office Action mailed Nov. 23, 2007", 8 pgs.
"U.S. Appl. No. 09/706,849, Non Final Office Action mailed Apr. 7, 2009", 13 pgs.
"U.S. Appl. No. 09/706,849, Non Final Office Action mailed May 1, 2007", 8 pgs.
"U.S. Appl. No. 09/706,849, Non Final Office Action mailed Jul. 18, 2005", 7 pgs.
"U.S. Appl. No. 09/706,849, Non Final Office Action mailed Oct. 22, 2004", 11 pgs.
"U.S. Appl. No. 09/706,849, Non Final Office Action mailed Nov. 28, 2006", 6 pgs.
"U.S. Appl. No. 09/706,849, Non-Final Office Action mailed Jun. 5, 2009", 13 pgs.
"U.S. Appl. No. 09/706,849, Preliminary Amendment mailed Jan. 12, 2001", 14 pgs.
"U.S. Appl. No. 09/706,849, Response filed Jan. 11, 2005 to Non Final Office Action mailed Oct. 22, 2004", 11 pgs.
"U.S. Appl. No. 09/706,849, Response filed Jan. 18, 2006 to Non Final Office Action mailed Jul. 18, 2005", 12 pgs.
"U.S. Appl. No. 09/706,849, Response filed Feb. 5, 2007 to Non Final Office Action mailed Nov. 28, 2006", 10 pgs.
"U.S. Appl. No. 09/706,849, Response filed Feb. 6, 2009 to Final Office Action mailed Aug. 6, 2008", 17 pgs.
"U.S. Appl. No. 09/706,849, Response filed May 23, 2008 to Final Office Action mailed Nov. 23, 2007", 16 pgs.
"U.S. Appl. No. 09/706,849, Response filed Oct. 24, 2007 to Non-Final Office Action mailed May 1, 2007", 16 pgs.
"U.S. Appl. No. 09/706,849, Response filed Dec. 7, 2009 to Non Final Office Action mailed Jun. 16, 2009", 14 pgs.
"U.S. Appl. No. 10/316,292, Final Office Action mailed Dec. 17, 2009", 5 pgs.
"U.S. Appl. No. 10/316,292, Non Final Office Action mailed Jan. 18, 2007", 4 pgs.
"U.S. Appl. No. 10/316,292, Non-Final Office Action mailed Feb. 7, 2008", 4 pgs.
"U.S. Appl. No. 10/316,292, Non-Final Office Action mailed Sep. 9, 2008", 4 pgs.
"U.S. Appl. No. 10/316,292, Response filed Mar. 9, 2009 to Non-Final Office Action mailed Sep. 9, 2008", 10 pgs.
"U.S. Appl. No. 10/316,292, Response filed Mar. 17, 2010 to Final Office Action mailed Dec. 17, 2009", 9 pgs.
"U.S. Appl. No. 10/316,292, Response filed Apr. 18, 2007 to Non Final Office Action mailed Jan. 18, 2007", 12 pgs.
"U.S. Appl. No. 10/316,292, Response filed May 2, 2008 to Non-Final Office action mailed Feb. 7, 2008", 10 pgs.
"U.S. Appl. No. 10/316,292, Response filed Oct. 31, 2007 to Restriction Requirement mailed Aug. 1, 2007", 8 pgs.
"U.S. Appl. No. 10/316,292, Restriction Requirement mailed Aug. 1, 2007", 6 pgs.
"U.S. Appl. No. 10/316,293, Examiner Interview Summary mailed Aug. 10, 2007", 2 pgs.
"U.S. Appl. No. 10/316,293, Final Office Action mailed Jan. 31, 2008", 12 pgs.
"U.S. Appl. No. 10/316,293, Non-Final Office Action mailed May 24, 2007", 9 pgs.
"U.S. Appl. No. 10/316,293, Non-Final Office Action mailed Aug. 11, 2008", 17 pgs.
"U.S. Appl. No. 10/316,293, Preliminary Amendment filed Apr. 28, 2005", 3 pgs.
"U.S. Appl. No. 10/316,293, Response filed Feb. 11, 2009 to Non-Final Office Action mailed Aug. 11, 2008", 11 pgs.
"U.S. Appl. No. 10/316,293, Response filed Jun. 30, 2008 to Final Office Action mailed Jan. 31, 2008", 16 pgs.
"U.S. Appl. No. 10/316,293, Response filed Nov. 7, 2007 to Non-Final Office Action mailed May 24, 2007", 16 pgs.
"U.S. Appl. No. 10/316,296, Advisory Action mailed Mar. 26, 2010", 3 pgs.
"U.S. Appl. No. 10/316,296, Examiner Interview Summary mailed Apr. 1, 2010", 3 pgs.
"U.S. Appl. No. 10/316,296, Final Office Action mailed Jan. 11, 2010", 17 pgs.
"U.S. Appl. No. 10/316,296, Final Office Action mailed Oct. 30, 2007", 16 pgs.
"U.S. Appl. No. 10/316,296, Non Final Office Action mailed Jun. 4, 2007", 16 pgs.
"U.S. Appl. No. 10/316,296, Non-Final Office Action mailed Jul. 11, 2008", 16 pgs.
"U.S. Appl. No. 10/316,296, Preliminary Amendment filed Apr. 28, 2005", 3 pgs.
"U.S. Appl. No. 10/316,296, Response filed Jan. 12, 2009 to Non-Final Office Action mailed Jul. 11, 2008", 19 pgs.
"U.S. Appl. No. 10/316,296, Response filed Mar. 11, 2010 to Final Office Action mailed Jan. 11, 2010", 19 pgs.
"U.S. Appl. No. 10/316,296, Response filed Apr. 30, 2008 to Final Office Action mailed Oct. 30, 2007", 24 pgs.
"U.S. Appl. No. 10/316,296, Response filed Oct. 4, 2007 to Non-Final Office Action mailed Jun. 4, 2007", 19 pgs.
"U.S. Appl. No. 10/316,297, Final Office Action mailed Aug. 7, 2008", 17 pgs.
"U.S. Appl. No. 10/316,297, Final Office Action mailed Oct. 17, 2007", 13 pgs.
"U.S. Appl. No. 10/316,297, Non-Final Office Action mailed May 16, 2007", 11 pgs.
"U.S. Appl. No. 10/316,297, Non-Final Office Action mailed Dec. 11, 2007", 21 pgs.

"U.S. Appl. No. 10/316,297, Preliminary Amendment filed Apr. 28, 2005", 3 pgs.
"U.S. Appl. No. 10/316,297, Response filed Feb. 9, 2009 to Final Office Action mailed Aug. 7, 2008", 13 pgs.
"U.S. Appl. No. 10/316,297, Response filed May 2, 2008 to Non-Final Office Action mailed Dec. 11, 2007", 15 pgs.
"U.S. Appl. No. 10/316,297, Response filed Aug. 14, 2007 to Non-Final Office Action mailed May 16, 2007", 13 pgs.
"U.S. Appl. No. 10/316,297, Response filed Oct. 31, 2007 to Final Office Action mailed Oct. 17, 2007", 15 pgs.
"U.S. Appl. No. 10/316,298, Final Office Action mailed Feb. 7, 2008", 5 pgs.
"U.S. Appl. No. 10/316,298, Final Office Action mailed Jun. 11, 2009", 5 pgs.
"U.S. Appl. No. 10/316,298, Non-Final Office Action mailed Feb. 9, 2007", 5 pgs.
"U.S. Appl. No. 10/316,298, Non-Final Office Action mailed Aug. 20, 2007", 4 pgs.
"U.S. Appl. No. 10/316,298, Non-Final Office Action mailed Oct. 3, 2008", 5 pgs.
"U.S. Appl. No. 10/316,298, Notice of Allowance mailed Sep. 3, 2010", 4 pgs.
"U.S. Appl. No. 10/316,298, Preliminary Amendment mailed Apr. 28, 2005", 3 pgs.
"U.S. Appl. No. 10/316,298, Response filed Mar. 3, 2009 to Non-Final Office Action mailed Oct. 3, 2008", 15 pgs.
"U.S. Appl. No. 10/316,298, Response filed May 4, 2007 to Non-Final Office Action mailed Feb. 9, 2007", 10 pgs.
"U.S. Appl. No. 10/316,298, Response filed Jul. 7, 2008 to Final Office Action mailed Feb. 7, 2008", 11 pgs.
"U.S. Appl. No. 10/316,298, Response filed Oct. 31, 2007 to Non-Final Office Action mailed Aug. 20, 2007", 10 pgs.
"U.S. Appl. No. 10/316,298, Response filed Dec. 11, 2009 to Final Office Action mailed Jun. 11, 2009", 10 pgs.
"U.S. Appl. No. 10/316,298, Restriction Requirement mailed Aug. 1, 2007", 7 pgs.
"U.S. Appl. No. 10/316,324, Advisory Action mailed Sep. 5, 2008", 3 pgs.
"U.S. Appl. No. 10/316,324, Examiner Interview Summary mailed May 28, 2009", 2 pgs.
"U.S. Appl. No. 10/316,324, Final Office Action mailed Jun. 11, 2008", 7 pgs.
"U.S. Appl. No. 10/316,324, Non-Final Office Action mailed Jun. 5, 2009", 22 pgs.
"U.S. Appl. No. 10/316,324, Non-Final Office Action mailed Mar. 3, 2009", 7 pgs.
"U.S. Appl. No. 10/316,324, Non-Final Office Action mailed Oct. 30, 2007", 6 pgs.
"U.S. Appl. No. 10/316,324, Notice of Allowance mailed Mar. 9, 2010", 8 pgs.
"U.S. Appl. No. 10/316,324, Preliminary Amendment filed Apr. 28, 2005", 3 pgs.
"U.S. Appl. No. 10/316,324, Response filed Apr. 30, 2008 to Non-Final Office Action mailed Oct. 30, 2007", 10 pgs.
"U.S. Appl. No. 10/316,324, Response filed Aug. 8, 2008 to Final Office Action mailed Jun. 11, 2008", 11 pgs.
"U.S. Appl. No. 10/316,324, Response filed Dec. 7, 2009 to Non Final Office Action mailed Jun. 16, 2009", 9 pgs.
"U.S. Appl. No. 10/316,325, Appeal Brief filed Oct. 20, 2010", 31 pgs.
"U.S. Appl. No. 10/316,325, Final Office Action mailed Feb. 22, 2010", 31 pgs.
"U.S. Appl. No. 10/316,325, Final Office Action mailed Oct. 30, 2007", 19 pgs.
"U.S. Appl. No. 10/316,325, Non Final Office Action mailed Jun. 11, 2007", 20 pgs.
"U.S. Appl. No. 10/316,325, Non-Final Office Action mailed Jun. 27, 2008", 18 pgs.
"U.S. Appl. No. 10/316,325, Preliminary Amendment filed Apr. 28, 2005", 3 pgs.
"U.S. Appl. No. 10/316,325, Response filed Apr. 30, 2008 to Final Office Action mailed Oct. 30, 2007", 23 pgs.
"U.S. Appl. No. 10/316,325, Response filed Oct. 11, 2007 to Non-Final Office Action mailed Jun. 11, 2007", 16 pgs.
"U.S. Appl. No. 10/316,325, Response filed Dec. 29, 2008 to Non Final Office Action mailed Jun. 27, 2008", 17 pgs.
"U.S. Appl. No. 10/316,326, Appeal Brief filed Oct. 19, 2010", 24 pgs.
"U.S. Appl. No. 10/316,326, Examiner Interview Summary mailed May 29, 2009", 2 pgs.
"U.S. Appl. No. 10/316,326, Final Office Action mailed Feb. 19, 2010", 11 pgs.
"U.S. Appl. No. 10/316,326, Final Office Action mailed Jun. 25, 2008", 8 pgs.
"U.S. Appl. No. 10/316,326, Non-Final Office Action mailed Apr. 3, 2009", 32 pgs.
"U.S. Appl. No. 10/316,326, Non-Final Office Action mailed Jun. 3, 2009", 12 pgs.
"U.S. Appl. No. 10/316,326, Non-Final Office Action mailed Oct. 30, 2007", 6 pgs.
"U.S. Appl. No. 10/316,326, Preliminary Amendment mailed Apr. 28, 2005", 3 pgs.
"U.S. Appl. No. 10/316,326, Response filed Apr. 30, 2008 to Non-Final Office Action mailed Oct. 30, 2007", 12 pgs.
"U.S. Appl. No. 10/316,326, Response filed Dec. 3, 2009 to Non Final Office Action mailed Jun. 4, 2009", 14 pgs.
"U.S. Appl. No. 10/316,326, Response filed Dec. 29, 2008 to Final Office Action mailed Jun. 25, 2008", 16 pgs.
"U.S. Appl. No. 10/318,676, Examiner Interview Summary mailed Apr. 14, 2010", 3 pgs.
"U.S. Appl. No. 10/318,676, Examiner Interview Summary mailed Oct. 30, 2007", 2 pgs.
"U.S. Appl. No. 10/318,676, Final Office Action mailed Oct. 30, 2007", 18 pgs.
"U.S. Appl. No. 10/318,676, Non Final Office Action mailed Jun. 4, 2007", 17 pgs.
"U.S. Appl. No. 10/318,676, Non-Final Office Action mailed Jun. 26, 2008", 15 pgs.
"U.S. Appl. No. 10/318,676, Preliminary Amendment filed Apr. 28, 2005", 3 pgs.
"U.S. Appl. No. 10/318,676, Response filed Apr. 30, 2008 to Final Office Action mailed Oct. 30, 2007", 15 pgs.
"U.S. Appl. No. 10/318,676, Response filed Oct. 9, 2007 to Non-Final Office Action mailed Jun. 4, 2007", 17 pgs.
"U.S. Appl. No. 10/318,676, Response filed Dec. 29, 2008 to Non Final Office Action mailed Jun. 26, 2008", 17 pgs.
"U.S. Appl. No. 10/319,868, Non-Final Office Action mailed Oct. 30, 2007", 8 pgs.
"U.S. Appl. No. 10/319,868, Preliminary Amendment filed Apr. 28, 2005", 3 pgs.
"U.S. Appl. No. 10/319,869, Final-Office Action mailed Oct. 30, 2007", 5 pgs.
"U.S. Appl. No. 10/319,869, Non-Final Office Action mailed Jul. 16, 2007", 6 pgs.
"U.S. Appl. No. 10/319,869, Preliminary Amendment filed Apr. 28, 2005", 3 pgs.
"U.S. Appl. No. 10/319,869, Response filed Oct. 16, 2007 to Non-Final Office Action mailed Jul. 16, 2007", 9 pgs.
"U.S. Appl. No. 10/733,700, Advisory Action mailed Sep. 9, 2008", 3 pgs.
"U.S. Appl. No. 10/733,700, Final Office Action mailed Jun. 25, 2008", 22 pgs.
"U.S. Appl. No. 10/733,700, Non- Final Office Action mailed Jun. 10, 2009", 14 pgs.
"U.S. Appl. No. 10/733,700, Non-Final Office Action mailed Dec. 6, 2007", 30 pgs.
"U.S. Appl. No. 10/733,700, Notice of Allowance mailed Jan. 29, 2010", 17 pgs.
"U.S. Appl. No. 10/733,700, Notice of Allowance mailed Jun. 22, 2010", 15 pgs.
"U.S. Appl. No. 10/733,700, Response filed Mar. 6, 2008 to Non-Final Office Action mailed Dec. 6, 2007", 23 pgs.
"U.S. Appl. No. 10/733,700, Response filed Apr. 16, 2009 to Restriction Requirement mailed Mar. 19, 2009", 13 pgs.

"U.S. Appl. No. 10/733,700, Response filed Aug. 25, 2008 to Final Office Action mailed Jun. 25, 2008", 25 pgs.
"U.S. Appl. No. 10/733,700, Response filed Sep. 10, 2009 to Non Final Office Action mailed Jun. 10, 2009", 15 pgs.
"U.S. Appl. No. 10/733,700, Restriction Requirement mailed Mar. 19, 2009", 8 pgs.
"U.S. Appl. No. 10/750,052, Advisory Action mailed Sep. 17, 2007", 3 pgs.
"U.S. Appl. No. 10/750,052, Appeal Brief filed Jan. 4, 2008", 25 pgs.
"U.S. Appl. No. 10/750,052, Decision on Pre-Appeal Brief Request mailed Dec. 4, 2007", 2 pgs.
"U.S. Appl. No. 10/750,052, Examiner's Answer to Appeal Brief mailed Feb. 12, 2008", 9 pgs.
"U.S. Appl. No. 10/750,052, Final Office Action mailed Jun. 26, 2007", 8 pgs.
"U.S. Appl. No. 10/750,052, Non Final Office Action mailed Dec. 22, 2006", 10 pgs.
"U.S. Appl. No. 10/750,052, Non-Final Office Action mailed Jul. 2, 2010", 8 pgs.
"U.S. Appl. No. 10/750,052, Notice of Allowance mailed Oct. 29, 2010", 22 pgs.
"U.S. Appl. No. 10/750,052, Pre-Appeal Brief Request filed Sep. 26, 2007", 5 pgs.
"U.S. Appl. No. 10/750,052, Reply Brief filed Apr. 8, 2008", 13 pgs.
"U.S. Appl. No. 10/750,052, Response filed Mar. 22, 2007 to Non Final Office Action mailed Dec. 22, 2006", 13 pgs.
"U.S. Appl. No. 10/750,052, Response filed Aug. 27, 2007 to Final Office Action mailed Jun. 26, 2007", 11 pgs.
"U.S. Appl. No. 10/750,052, Response filed Sep. 19, 2006 to Restriction Requirement mailed Aug. 2, 2006", 8 pgs.
"U.S. Appl. No. 10/750,052, Response filed Oct. 4, 2010 to Non Final Office Action mailed Jul. 2, 2010", 9 pgs.
"U.S. Appl. No. 10/750,052, Restriction Requirement mailed Aug. 2, 2006", 7 pgs.
"U.S. Appl. No. 11/618,632, Decision on Pre-Appeal Brief Request mailed Apr. 13, 2010", 2 pgs.
"U.S. Appl. No. 11/618,632, Final Office Action mailed Oct. 30, 2009", 19 pgs.
"U.S. Appl. No. 11/618,632, Non-Final Office Action mailed Dec. 24, 2008", 10 pgs.
"U.S. Appl. No. 11/618,632, Notice of Allowance mailed Aug. 6, 2010", 7 pgs.
"U.S. Appl. No. 11/618,632, Pre-Appeal Brief Request filed Mar. 1, 2010", 4 pgs.
"U.S. Appl. No. 11/618,632, Response filed Jun. 24, 2009 to Non Final Office Action mailed Dec. 24, 2008", 16 pgs.
"U.S. Appl. No. 11/648,213, Final Office Action mailed Nov. 3, 2010", 13 pgs.
"U.S. Appl. No. 11/648,213, Non Final Office Action mailed May 5, 2010", 9 pgs.
"U.S. Appl. No. 11/648,213, Response filed Oct. 5, 2010 to Non Final Office Action mailed May 5, 2010", 11 pgs.
"U.S. Appl. No. 11/963,130, Non-Final Office Action mailed May 13, 2010", 10 pgs.
"U.S. Appl. No. 11/963,130, Response filed Nov. 12, 2010 to Non Final Office Action mailed May 13, 2010", 11 pgs.
"U.S. Appl. No. 12/710,294 Non-Final Office Action mailed Sep. 30, 2010", 12 pgs.
"Cassini Resource Exchange User's guide", California Institute of Technology, (Apr. 1993), 19 pgs.
"Chicago Firm Offers Internet Brokerage Services", Simba Information, Inc., Media Daily, (Dec. 21, 1994), Section No. 342, vol. 2.
"Computer Museum hosts Internet Auction", Computerworld, (Mar. 28, 1994), 1 page.
"Confidential Deposition of Jason Robert Surratt", *MercExchange, L.L.C.* v. *eBay Inc., and Returnbuy, Inc.*, United States District Court Eastern District of Virginia Norfolk Division, Civil Action No. 2:01-CV-736, (Jun. 20, 2002), 47 pgs.
"Corrected Brief of Appellants", In the United States Court of Appeals for the Federal Circuit, Case No. 03-1600, -1616, *MercExchange, L.L.C.* v. *eBay, Inc. and Half.com, Inc.*, (Jan. 6, 2004), 70 pgs.

"Daemon", [Online]. Retrieved from the Internet: <URL: http://www.webopedia.com/TERM/d/daemon.html>, (Jun. 2, 2004), 2 pgs.
"Deposition of Alan Fisher, vol. 1", *MercExchange, L.L.C.* v. *eBay Inc., and Returnbuy, Inc.*, United States District Court Eastern District of Virginia Norfolk Division, Civil Action No. 2:01-CV-736, (Jun. 18, 2002), 22 pgs.
"Deposition of Alan Fisher, vol. II", *MercExchange, L.L.C.* v. *eBay Inc., and Returnbuy, Inc.*, United States District Court Eastern District of Virginia Norfolk Division, Civil Action No. 2:01-CV-736, (Jun. 19, 2002), 24 pgs.
"Deposition of Jerry Kaplan", *MercExchange, L.L.C.* v. *eBay Inc., and Returnbuy, Inc.*, United States District Court Eastern District of Virginia Norfolk Division, Civil Action No. 2:01-CV-736, (Jun. 18, 2002), 49 pgs.
"Deposition of Pierre Omidyar", *MercExchange, L.L.C.* v. *eBay Inc., and Returnbuy, Inc.*, United States District Court Eastern District of Virginia Norfolk Division, Civil Action No. 2:01-CV-736, (Jun. 4, 2002), 14 pgs.
"Deposition of Thomas Woolston", *MercExchange, L.L.C.* v. *eBay Inc., and Returnbuy, Inc.*, United States District Court Eastern District of Virginia Norfolk Division, Civil Action No. 2:01-CV-736, (Apr. 16, 2002), 52 pgs.
"FCC Will Allow Remote Electronic Bidding in Oct. 26 Narrowband PCS Auction", Common Carrier Week, (Oct. 10, 1994), 2 pgs.
"First Auction Wins the Bid for Online", Internet Shopping Network,, (Jan. 7, 2002), 4 pgs.
"Google Newsgroup RE: press/Digital and Open Market Partner to do Business Over the Internet", Digital Press & Analysis News, (Nov. 7, 1994), 3 pgs.
"Google: Definition of System", (Jun. 5, 2008), 4 pgs.
"How an Auction Works", [Online]. Retrieved from the Internet: <URL: http://web.archive.org/web/20030618083111/www.bidshares.com/help/index.cfm?fuseaction=info_howauctionworks>, (Jun. 2003), 3 pgs.
"Interactive Collector: Archive Catalogs", (Nov. 1994), 2 Pages.
"International Application Serial No. PCT/US03/41535, International Preliminary Examination Report mailed May 26, 2005", 4 pgs.
"Mosaic for X version 2.0 Fill-Out form Support", mosaic-x@ncsa.uiuc.edu, Appendix B, mailed to the USPTO Oct. 24, 1994, 9 pgs.
"New bidding rules to begin in FCC's auction of airwave", Austin American Statesmen (Newspaper), Final Edition, (Feb. 4, 1995), D.5.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for The Computer Museum in Boston", Business Wire, Dialog Web. 0489267 BW0022, (May 24, 1995), 3 pages.
"Preview Media and America Online Announce New Travel Services for America online Subscribers", PR Newswire, (Feb. 7, 1995), 3 pgs.
"Prodigy outline Internet Plans, Launches Services Sep. 24, 1994", Newsbytes News Network, (Sep. 29, 1994), 3 pgs.
"Seventh Annual Intermac Users Group Education Symposium", Computerworld, (Mar. 28, 1994), 1 page.
"Spry's Air Mosaic Express Provides Internet Access to World Wide Wed", The PC Netter, (Dec. 1, 1994), vol. 9, No. 12.
"Video Deposition of Thomas Woolston", *MercExchange, L.L.C.* v. *eBay Inc., and Returnbuy, Inc.*, United States District Court Eastern District of Virginia Norfolk Division, Civil Action No. 2:01-CV-736, (Jun. 18, 2002), 79 pgs.
"Video Deposition of Thomas Woolston, vol. 2", *MercExchange, L.L.C.* v. *eBay Inc., and Returnbuy, Inc.*, United States District Court Eastern District of Virginia Norfolk Division, Civil Action No. 2:01-CV-736, (Jun. 19, 2002), 79 pgs.
"Video Deposition of Thomas Woolston, vol. 3", *MercExchange, L.L.C.* v. *eBay Inc., and Returnbuy, Inc.*, United States District Court Eastern District of Virginia Norfolk Division, Civil Action No. 2:01-CV-736, (Jun. 20, 2002), 80 pgs.
"What's new at eBay's Auction Web", AuctionWeb What's New, [Online]. Retrieved from the Internet: <URL: http://web.archive.org/web19981202085151/http://www.ebay.com/aw/update.html>, (May 18, 2005), 6 pgs.

Anand, R., "Research Report—The Electronic Flea Market", Computer Science, RC 19678 (87230), IBM Research Division, (Jul. 28, 1994), 1-18.
Anderson, Scott, et al., "The Efficiency of Experimental Asset Markets: Empirical Robustness and Subject Sophistication", Research in Experimental Economics, The Journal of Economic Education, transferred in, (Fall 1993), 107-190.
Bakos, J. Y, "A Strategic Analysis of Electronic Marketplaces", MIS Quarterly vol. 15, No. 3 (Sep. 1991), p. 295-310.
Banatre, J-P, "The Design and Building of Enchere, A Distributed Electronic Marketing System", Communications of the Association for Computing Maiciner, New York, NY, US. vol. 29 No. Jan. 1986, XP000002077, 9-29.
Banatre, Michael, "Distributed Auction Bidding System", Computer Communications, vol. 4, No. 4, (Aug. 1981), 179-186.
Baty, J., et al., "InterShop: Enhancing the Vendor/Customer Deialectic in Electronic Shopping", Journal of Management information Systems vol. II, No. 4,, (1995), pp. 9-31.
Brooker, Ellis, "Mega Real Estate Auction Counts on Imaging", Computerworld, (Dec. 7, 1982), 20.
Bunker, Ted, "How Auction Technology Sped and Enhanced Sale of Radio Licenses", Copyright 1995 Investor's Business Daily, Inc., Investor's Business Daily, (Feb. 24, 1995), 3 pages.
Business Week, "Auctioning off Relics of the Computer Age", Business Week, (Apr. 11, 1994), 1 page.
Business Wire, "Save the Earth Foundation: Internet Online Rock and Roll Art Auction Celebrating Earth Day is Declared Open to the World for One Month", Business Wire, (copyright) 1999 Business Wire, transferred in, (Apr. 25, 1995), 2 pages.
Business Wire, Inc., "The Computer Museum Brings Auction Block to Cyberspace in First Internet Auction", Business Wire, Inc., (Mar. 14, 1994), 2 pages.
Chabrow, E., "A New Era Is Brokered In", Information Week, (Sep. 18, 1995), 3 pgs.
Churbuck, D., "Dial-A-Catalog", Forbes, (Oct. 10, 1994), p. 126-130.
Clarke, R., "The Strategic Intent of Online Trading Systems a Case Study in National Livestock Marketing", Xamax Consultancy Ltd., (Aug. 16, 1992), 22 pgs.
Clemons, E, "Evaluating the prospects for alternative electronic securities", Proceedings of ICIS 91: 12th International Conference on Information Systems, (Dec. 16-18, 1991), 53-61.
Clifford, D., "Notes on Community Information Systems", (Dec. 10, 1989), 7 pgs.
Cohen, D., "Computerized Commerce", Proceedings of the IFIP World Camputer Congress Held Aug. 28-Sep. 1, 1989, Reprinted From Information Processing 89, (Oct. 1989), 27 pgs.
Cohen, Danny, "Electronic Commerce", University of Southern California, Information Sciences Institute, ISI Research Report, ISI/RR-89-244, (Oct. 1989), 1-19, 31-33.
Computer Literacy Book Bulletin, "First Internet Auction", Computer Literacy Book Bulletin, 1 page.
Court of Appeals for the Federal, "In re Schrader, 30 USPQ 2d, 1455-1462", Court of Appeals for the Federal Circuit, claim 1 of application at issue cited at col. 2, (Apr. 13, 1994), 1456-1462.
Davies, S. A, "Treasury action to 'go live' with computer tenders. (Treasury Automated Auction Processing System, or TAAPS)(Public securities association supplement)", Bond Buyer v. 304, n2914, (Apr. 29, 1993), 5 pgs.
Demarrais, K. G, "Gas Prices Highest Since 1991, and Still Climbing", The Record, (Jun. 16, 1995), p. 3.
Dyson, E., "Information, Bid and Asked", Forbes, vol. 146, Issue 4, (Aug. 20, 1990).
Edell, Richard, "Billing Users and Pricing for TCP", IEEE Journal on Selected Areas in Communications, vol. 13, No. 7, (Sep. 1995), 1162-1175.
Elmer-Dewitt, P., "Battle for the Soul of the Internet", Time Magazine Cover Story Technology Section, (Jul. 26, 1994), 10 pgs.
Forsythe, Robert, "The Iowa Presidential Stock Market: A Field Experiment", Research in Experimental Economics, vol. 4, ISBN: 0-89232-652-2, (1991), 1-43.

Franklin, Matthew, "The Design and Implementation of a Secure Auction Service", 1995 IEEE Symposium on Security and Privacy, Oakland, California May 8-10, 1995, 2-14.
Freeman, Brian, "Hosting Services—Linking the Information Warehouse to the Information Consumer", IEEE Spring Compcon, transferred in, (1994), 165-171.
Graham, I, "The Emergence of Linked Fish Markets in Europe", Focus Theme, 1-3.
Grant, G., "Mosaic Communications Unveils Network Navigator and Server Software for the Internet", (Sep. 1, 1994), 3 pgs.
Graves, Robert, et al., "An Auction method for Course Registration", Interfaces 23:5, Sep. Oct. 1993, transferred in, 81-92.
Harrison Scott Publications, "Unusual Farmland Auction Set", Liquidation Alert, Harrison Scott Publications, Inc., (Mar. 28, 1994), 2 pages.
Harvard Business School, "Aucnet: The Story Continues", Harvard Business School 2-195-122, (Jan. 17, 1995), 1 page.
Hauser, R, "Anonymous Delivery of Goods in Electronic Commerce", IBM Technical Disclosure Bulletin, 39(3), (Mar. 1996), 363-366.
Helinski, Paul, "Automating Web-Site Maintenance", Part 2, Perl-based tools to manage your Web site, Web Techniques, ISSN 1086-556XP002048313., www.ddj.com/architect/184414429?pgno==3>, (Dec. 1996), 75-76, 78.
Heng-Wah, Choy, Declaration of Choy Heng-Wah Regarding BidBroker Software—an Electronic Auction System filed in MercExchange, LLC v. eBayInc., et al., Case No. 2:01-CV-736 (E.D. Va), (Mar. 8, 2002), 13 pgs.
Heng-Wah, Choy, "Google Newsgroup RE: Electronic Stamp Auction", (Jun. 17, 1994), 1 page.
Hess, C M, et al., "Computerized Loan Organization System: An Industry Case Study of the Electronic Markets Hypothesis", MIS Quarterly, vol. 18(3), (Sep. 1994), 251-274.
Jackson, Ed, "Too much commercial offers", Google Groups, (Mar. 13, 1996), 2 pages.
Johnson, et al., "Automated double oral auctions using IBM PC network", Association for Computing Machinery, CSC '86 Cincinnati Proceedings, (Feb. 1986), p. 507.
Johnson, Alonzo, "Multiple Unit Double Auction User's Manual", Social Science Working Paper 676, Division of the Humanities and Social Sciences California Institute of Technology, Jun. 1988, Revised Sep. 1989, 1-9.
Kaehler, Ted, "Betting, Bribery and Bankruptcy—A Simulated Economy that Learns to Predict", IEEE Spring Compcon, Research Report, (1989), 357-361.
Kaplan, S. J, "Intermart: the Virtual Shopper's Paradise", Intermart, (Dec. 7, 1994), 17 pgs.
Kelly, S, "Jury Still Out on Treasury's Dutch Experiment", New York, N.Y.: Apr. 29 vol. 304, Iss. 29141, (1993), 4 pgs.
Klein, S, "Introduction to Electronic Auctions", Focus Theme, 1-4.
Ledyard, J., et al., "Using Computerized Exchange Systems to Solve an Allocation Problem in Project Management", California Institute of Technology, (Nov. 1993).
Lee, H G, "AUCNET: Electronic Intermediary for Used-Car Transactions", Focus Theme, 1-5.
Lee, H. G, "Electronic brokerage and electronic auction: the impact of IT on market structures", Proceedings of the Twenty-Ninth Hawaii International Conference on System Sciences, vol. 4, (1996), 397-406.
Littlefair, T., "Homelink: a unique service", Computer bulletin, (Jun. 1986), 12-13.
MacKinnon, Donna Jean, "Playing the Auction Game", SU2 Edition, Toronto Star, Ontario, p. E.1, (Oct. 4, 1987), 3 pages.
Malone, T., et al., "Electronic Markets and Electronic Hierarchies", Communications of the ACM, 14(25), (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Maskery, Maryann, "Car auction reaches into space", Automotive News, Dialog File 16, Accession No. 03482064, (Nov. 25, 1991), 3 pgs.
Massimb, Marcel, "Electronic Trading, Market Structure and Liquidity", Financial Analysts Journal, 50(1), (Jan./Feb. 1994), 39-50.

McCabe, Kevin, "Smart Computer-Assisted Markets", Science, vol. 254, transferred in, (Oct. 25, 1991), 534-538.

McCarthy, Gene, "The Electronic Auctioning of Servicing", Mortgage Banking, (Dec. 1994), 96-98.

McConkey, Carey, "Company Launches Reverse Auction Site", The State News, (Oct. 25, 1999), 3 pgs.

McGookin, Stephen, "Home-based brokers stay on-line via the Internet—The number of personal on-line brokerage accounts . . . ", The Financial Times Limited; Financial Times (London, England), (Nov. 1, 1995), p. 13.

Messmer, E., "Car Auctions Via Business TV to Debut Plans to launch as Online Used Car Auction Service", Network World, vol. 11, Iss.30, (Jul. 25, 1994), 1 pg.

Milgrom, Paul R, et al., "A Theory of Auctions and Competetive Bidding", Econometrica, vol. (50), No. 5, (Sep. 1982), 1089-1122 pp.

Milgrom, Paul, "Putting Auctions Theory to work :The Simultaneous ascending Auction", The Journal of Political Economy, vol. 180, No. 2, (Apr. 2000), 245-272.

Neo, B S, "The implementation of an electronic market for pig trading in Singapore", Journal of Strategic Information Systems; vol. 1(5), (Dec. 1992), 278-288.

Oates, Sarah, "Rain Checks May Be Allowed", Orlando Sentinel, (Jul. 13, 1988), 1 pg.

Obraczka, K., et al., "Internet Resource Discovery", (Sep. 1993), p. 8-22.

O'Dell, John, "Automobiles", The Los Angeles Times copyright, The Times Mirror Company; Los Angeles Times 1994 All Rights Reserved, (Aug. 23, 1994), 13-14.

Omidyar, P., "Google Newsgroup RE: AuctionWeb: Interactive Web Auction", (Sep. 12, 1995), 3 pgs.

PC Week, "Electronic Bonds Auction", PC Week, vol. 6, No. 22, (Jun. 5, 1989), 68.

Pope, Christina, "What Am I Bid? Check the Modem: Electronic Auctions Come to Real Estate", The Greater Baton Rouge Business Report, vol. 11, No. 26, (Jul. 27, 1993), 27.

Post, D L, et al., "Application of auctions as a pricing mechanism for the interchange of electric power", IEEE Transactions on Power Systems, 10(3), (Aug. 1995), 1580-1584.

Preist, Chris, et al., "Adaptive Agents in a Persistent Shout Double Auction", International Conference on Information and Computation Economies, Proceedings of the first international conference on Information and computation economies, (1999), 11-18.

Reck, M., "Formally Specifying an Automated Trade Execution System", The Journal of Systems and Software, 1993, Elsevier Science Publishing, USA, (1993), 245-252.

Reck, M., et al., "Types of Electronic Auctions", (1992), p. 236-243.

Reck, Martin, "Trading-Process Characteristics of Electronic Auctions", Focus Theme, 1-7.

Resnick, P., et al., "Twenty-Second Annual Telecommunications Policy Research Conference: Papers Section 2", Solomons, MD, (Oct. 1-3, 1994), p. 1-23.

Rockoff, T E, et al., "Design of an Internet-based system for remote Dutch auctions", Internet Research: Electronic Networking Applications and Policy, vol. 5(4), (Jan. 1, 1995), 10-16.

Saeki, Motoshi, "Supporting Distributed Individual Work in Cooperative Specification Development", Dept. of Computer Science, Tokyo Institute of Technology, (Nov. 15, 1995), 232-247.

Sammer, Harald, "Online Stock Trading Systems: Study of an Application", IEEE Spring Compcon, (Spring 1987), 161-162.

Saunders, Barbara, "Final Gas 'De-vintaging' Rule Contains 2 Major Changes for Negotiations", Oil Daily, (Jun. 10, 1986), 1-2.

Schmid, B F, "The Development of Electronic Commerce", EM—Electronic Markets, No. 9-10, (Oct. 1993), 2 pgs.

Schmitz, Tom, "California computer auctions—No Boon for Bargain Hunters", Knight-Ridder/Tribune Business News, Dialog File 609, Accession No. 2096205, (Sep. 13, 1993), 4 pgs.

Schwartz, Michael F., "Internet Resource Discovery at the University of Colorado", (Oct. 1992), 16 pgs.

Shamos, M. J, "Expert Report of Michael Ian Shamos Regarding Materiality of Prior Art Regerence Not Disclosed by Patentee", filed by eBay, (Sep. 23, 2002), 10 pgs.

Sharnoff, David, "Email Auction Server", [Online]. Retrieved from the Internet: <URL: http://www.idiom.com/~muir/auction.html>, (1994), 1 Page.

Shulman, Richard, "VICS and quick response: priority issued for mass merchandisers.", Supermarket Business, v44, n10, (Oct. 1989), 13-14.

Siegmann, Ken, "Nowhere to go but up", PC Week; vol. 12(42), Ziff-Davis Publishing Company, (Oct. 23, 1995), 1-3.

Sirbu, Marvin, et al., "Netbill: An Internet Commerce System Optimized for Network-Delivered Services", IEEE Personal Communications, 2, (Aug. 1995), 34-39.

Smith, Charles W, "Auctions, The Social Construction of Value", University of California Press, Berkeley, (1990), 123 pgs.

Smith, Rod, "DTN, Superior to Offer Daily Electronic Auction", Feedstuffs, Business Report Section, (Feb. 8, 1993), 1 Pages.

Smith, V., "Auctions, Bidding and Contracting: Uses and Theory— An Experimental Comparison of Alternative Rules for Competitive Market Exchange", New York University Press, (1983), pp. 307-334.

Smith, V., et al., "Competitive Market Insitutions: Double Auctions vs Sealed Bid-Offer Auctions", The American Economic Review, (Mar. 1982), vol. 72, No. 1.

Tenenbaum, J., "CommerceNet: spontaneous electronic commerce on the Internet", Compcon '95.'Technologies for the Information Superhighway', Digest of Papers., (1995), 38-43.

Tenenbaum, J., et al., "Development of Network Infrastructure and Services for Rapid Acquisition", (Jan. 2, 1992), 19 pgs.

Tetzeli, R., "Electronic Storefronts on the Interne", Fortune, (Nov. 28, 1994), p. 191.

The Computer Museum Auction, "First-ever Internet Auction Produces Results for the Computer Museum", Press release, (duplicate releases), (Apr. 28, 1994), 4 pages.

Thomas, Charles, "Automotive News", Copyright 1994 Crain Communications Inc., (Sep. 19, 1994), 11-12.

Tjostheim, Ingvar, "A case study of an on-line auction for the World Wide Web", Norwegian Computing Center (NR), 1-10.

Toner, A., "Hogs Sold in High-Tech Market Bidders Linked Throught Satellite", Omaha World-Herald, (Sep. 11, 1994).

Traub, MTG: All Editions Rare and Uncommon Auction, rec.games. deckmaster, (May 9, 1994), 9 pgs.

Turban, E, "Auctions and Bidding on the Internet: An Assessment", Focus Theme, 1-5.

Turoff, Murray, "An Electronic Information Marketplace", North-Holland Computer Networks and ISDN Systems 9, transferred in, (1985), 79-90.

Underwood, Chris, "A Mulitple Round Ascending Auction Process Suitable for the Disposal of Radio Spectrum in New Zealand", (Jan. 17, 1996).

Van Heck, E., et al., "Experiences with Electronic Auctions in the Dutch Flower Industry", Focus Theme, Erasmus University, The Netherlands, 6 pgs.

Varian, Hal, "Economic Mechanism Design for Computerized Agents", USENIX Association Proceedings of the First USENIX Workshop of Electronic Commerce, New York, New York Jul. 11-12, 1995, transferred in, (Jul. 1995), 13-21.

Voelker, et al., "Mobisaic: an information system for a mobile wireless computing environment", IEEE, (1995), pp. 185-190.

Warbelow, A, et al., "Aucnet: TV Auction Network System", Harvard Business School Case/Study, HBVR#9-190-001, USA, (Jul. 1989), 1-15.

Weiss, Aaron, "The Virtual Flea Market", Internet World, (Jun. 1995), 54-57.

Williams, Arlington, et al., "Computerized Laboratory Exercises for Microeconomics Education: Three Applications Motivated by Experimental Economics", The Journal of Economic Education, vol. 24, No. 4, transferred in, (Fall 1993), 13 pages.

Zwass, V., "Electronic Commerce: Structures and Issues", International Journal of Electronic Commerce, Fall 1996, vol. 1, No. 1, (Fall 1996), 3-23.

"U.S. Appl. No. 09/706,849, Advisory Action mailed Dec. 10, 2010", 2 pgs.

"U.S. Appl. No. 09/706,849, Examiner's Answer to Appeal Brief mailed Feb. 2, 2011", 13 pgs.

"U.S. Appl. No. 10/316,293, Response filed Apr. 25, 2011 to Restriction Requirement mailed Mar. 25, 2011", 9 pgs.
"U.S. Appl. No. 10/316,297, Non Final Office Action mailed Mar. 25, 2011", 19 pgs.
"U.S. Appl. No. 10/316,324, Notice of Allowance mailed Mar. 4, 2011", 9 pgs.
"U.S. Appl. No. 10/316,325, Examiner's Answer to Appeal Brief mailed Jan. 7, 2011", 21 pgs.
"U.S. Appl. No. 10/316,326, Examiner's Answer to Appeal Brief mailed Dec. 23, 2010", 9 pgs.
"U.S. Appl. No. 10/316,326, Reply Brief filed Feb. 23, 2011", 4 pgs.
"U.S. Appl. No. 10/706,849, Advisory Action mailed Dec. 10, 2010", 3 pgs.
"U.S. Appl. No. 10/316,293, Restriction Requirement mailed Mar. 25, 2011", 4 pgs.
"U.S. Appl. No. 11/648,213, Response filed Mar. 3, 2011 to Final Office Action mailed Nov. 3, 2010", 9 pgs.
"U.S. Appl. No. 11/963,130, Final Office Action mailed Dec. 27, 2010", 27 pgs.
"U.S. Appl. No. 11/963,130, Response filed Feb. 28, 2011 to Final Office Action mailed Dec. 27, 2010", 12 pgs.
"U.S. Appl. No. 12/710,294, Notice of Allowance mailed Apr. 15, 2011", 10 pgs.
"U.S. Appl. No. 12/710,294, Response filed Jan. 31, 2011 to Non Final Office Action mailed Sep. 30, 2010", 11 pgs.
"U.S. Appl. No. 11/963,130, Advisory Action mailed Mar. 8, 2011", Advisory Action, 3.
"Ranch Auction Biddling Climbs", Journal Record. Oklahoma City, Okla, (Jun. 1992).
"U.S. Appl. No. 09/706,849, Reply Brief filed Apr. 4, 2011", 6 pgs.
"U.S. Appl. No. 10/316,293, Non Final Office Action mailed Jul. 8, 2011", 13 pgs.
"U.S. Appl. No. 10/316,293, Response Filed Dec. 8, 2011 to Non-Final Office Action", 13 pgs.
"U.S. Appl. No. 10/316,297, Final Office Action mailed Dec. 2, 2011", 22 pgs.
"U.S. Appl. No. 10/316,297, Response filed Sep. 26, 2011 to Non Final Office Action mailed May 25, 2011", 18 pgs.
"U.S. Appl. No. 10/316,325, Reply Brief filed Mar. 7, 2011", 4 pgs.
"U.S. Appl. No. 10/318,676, Examiner Interview Summary Mar. 25, 2011", 3 pgs.
"U.S. Appl. No. 11/963,130, Response filed Jun. 27, 2011 to Final Office Action mailed Dec. 27, 2010", 12 pgs.
"U.S. Appl. No. 12/710,294, 312 Amendment filed Jul. 13, 2011", 6 pgs.
"U.S. Appl. No. 12/710,294, PTO Response to 312 Amendment mailed Jul. 29, 2011", 2 pgs.
"International Application Serial No. PCT/US03/41535, International Preliminary Examination Report mailed May 12, 2005", 3 pgs.
"U.S. Appl. No. 09/504,261, Decision on Appeal mailed Mar. 28, 2012", 10 pgs.
"U.S. Appl. No. 10/316,293, Final Office Action mailed Jan. 30, 2012", 14 pgs.
"U.S. Appl. No. 11/963,130, Non Final Office Action mailed Mar. 28, 2012", 7 pgs.
"U.S. Appl. No. 11/963,130, Response filed Jun. 28, 2012 to Non Final Office Action mailed Mar. 28, 2012", 17 pgs.
"U.S. Appl. No. 13/182,196, Non Final Office Action mailed Mar. 16, 2012", 7 pgs.
"U.S. Appl. No. 13/182,196, Response filed Jun. 18, 2012 to Non Final Office Action mailed Mar. 16, 2012", 9 pgs.

* cited by examiner

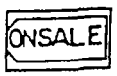 Cordless 10-Channel Phone Model 5400

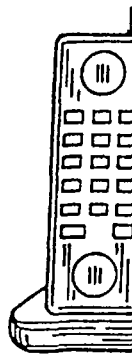

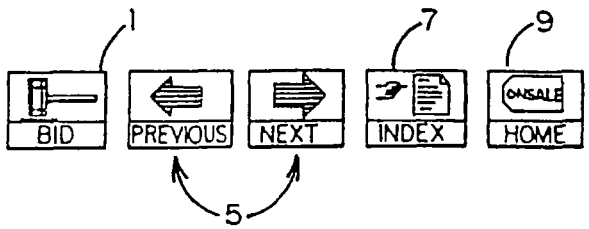

List Price: $129.95
Minimum Bid: $1.00
Bid Increment: $2.00
Quantity Available: 16

Auction closes on Fri Mar 29, 1996 1:00 PST.
Sales Format: <u>Dutch Auction</u>

The current high bidders are:

☐ NY of Reno, NV, Tue Mar 26, 3:27 pm ($25.00, 1)
☐ PM of Petersburg, VA, Tue Mar 26, 4:18 pm ($19.00, 1)
☐ NA of Corinth, TX, Tue Mar 26, 3:43 ($17.00, 1): "FOR THE WIFE"
☐ MN of Grand Prairie, TX, Tue Mar 26, 4:24 pm ($17.00, 1)
☐ RD of Cambridge, MA, Tue Mar 26, 2:43 ($15.00, 1)
☐ BC of St Laurent, PQ, Tue Mar 26, 2:52 pm ($15.00, 1)
☐ JF of Scranton, PA, Tue Mar 26, 2:59 pm ($15.00, 1)
☐ CC of Evansville, IN, Tue Mar 26, 3:01 pm ($15.00, 1)
☐ DP of Columbia, SC, Tue Mar 26, 3:12 pm ($15.00, 2)
☐ LR of Gainesville, FL, Tue Mar 26, 3:40 pm ($15.00, 1)
☐ RR of Washington, NC, Tue Mar 26, 3:15 pm ($13.00, 1)
☐ FW of University Park, PA, Tue Mar 26, 4:29 ($9.00, 1)
☐ DB of Evansville, IN, Tue Mar 26, 2:45 pm ($5.00, 1)
☐ SK of Goshen, KY, Tue Mar 26, 2:59 pm ($5.00, 2 out of 16)

Item #1918.

This Factory Reconditioned Cordless Phone Model 5400 Features:

☐ Clarity Plus, circuitry for virtually static-free reception
☐ 10-Channel selection
☐ 9-Number memory
☐ Lighted Dial
☐ Handset holds charge for up to 7 days
☐ Available in Two-tone Gray

FIG. 2

 Cordless 10-Channel Phone Model 5400

NOTICE: It is a violation of law to make bids in a false name or with an invalid credit card, even if the software initially accepts such a bid. Please be aware that even if you do not give us your real name, your web browser transmits a unique internet address to us, which can be used by law enforcement officials to identify you.

Minimum Bid: $1.00
Bid increment: $2.00

Bid (price not to exceed):
              Quantity:

The quantity you request may not always be available. Click here if you are not willing to accept a reduced quantity. ☐

Applicable sales tax, if any, will be added to your order.

If you enter your ONSALE account number, you only need to enter your first name (for security) in the Shipping Address area below.

Account Number: (Optional)
Shipping Address:
     First Name:
      Last Name:
        Street1:
        Street2:
          City:
  State/Province:
       Zip Code:
        Country:
   Email Address:
  Daytime Phone:
Nighttime Phone:
           FAX:

Your credit card number is required to guarantee your bid. Your card will not be charged unless your bid is successful. Only Visa and MasterCard cards are accepted.

Credit Card #:
Expiration Date: Month (e.g. "07")  Year (Optional) Credit card billing address if different from shipping address:

Name as on Card:
       Street1:
       Street2:
         City:
  State/Province:
      Zip Code:
       Country:

(Optional) You can enter a comment for display on screen with your bid.
    Comment:
Click here if you do not want ONSALE to keep you informed of current high bids via electronic mail. ☐  2 — [PLACE BID]  [CLEAR FORM]

     

FIG. 3

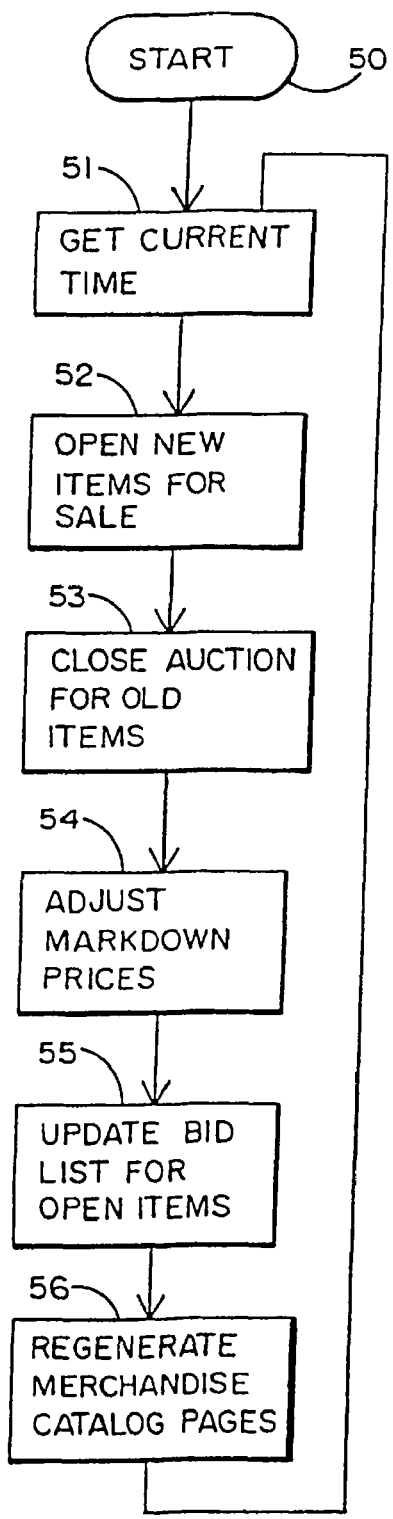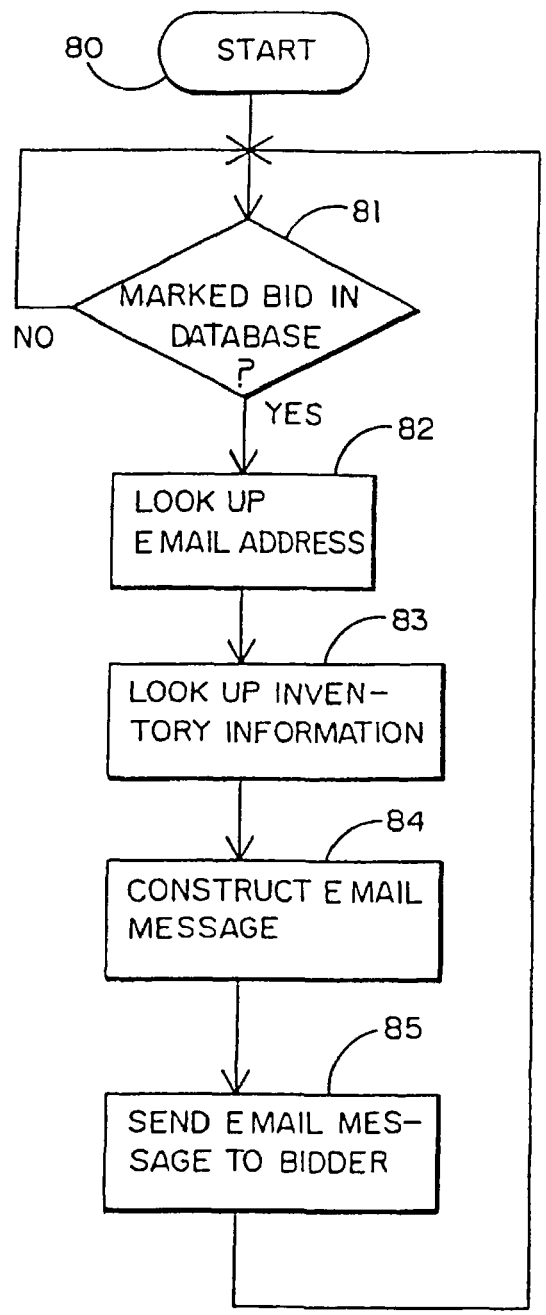
FIG. 6
FIG. 8

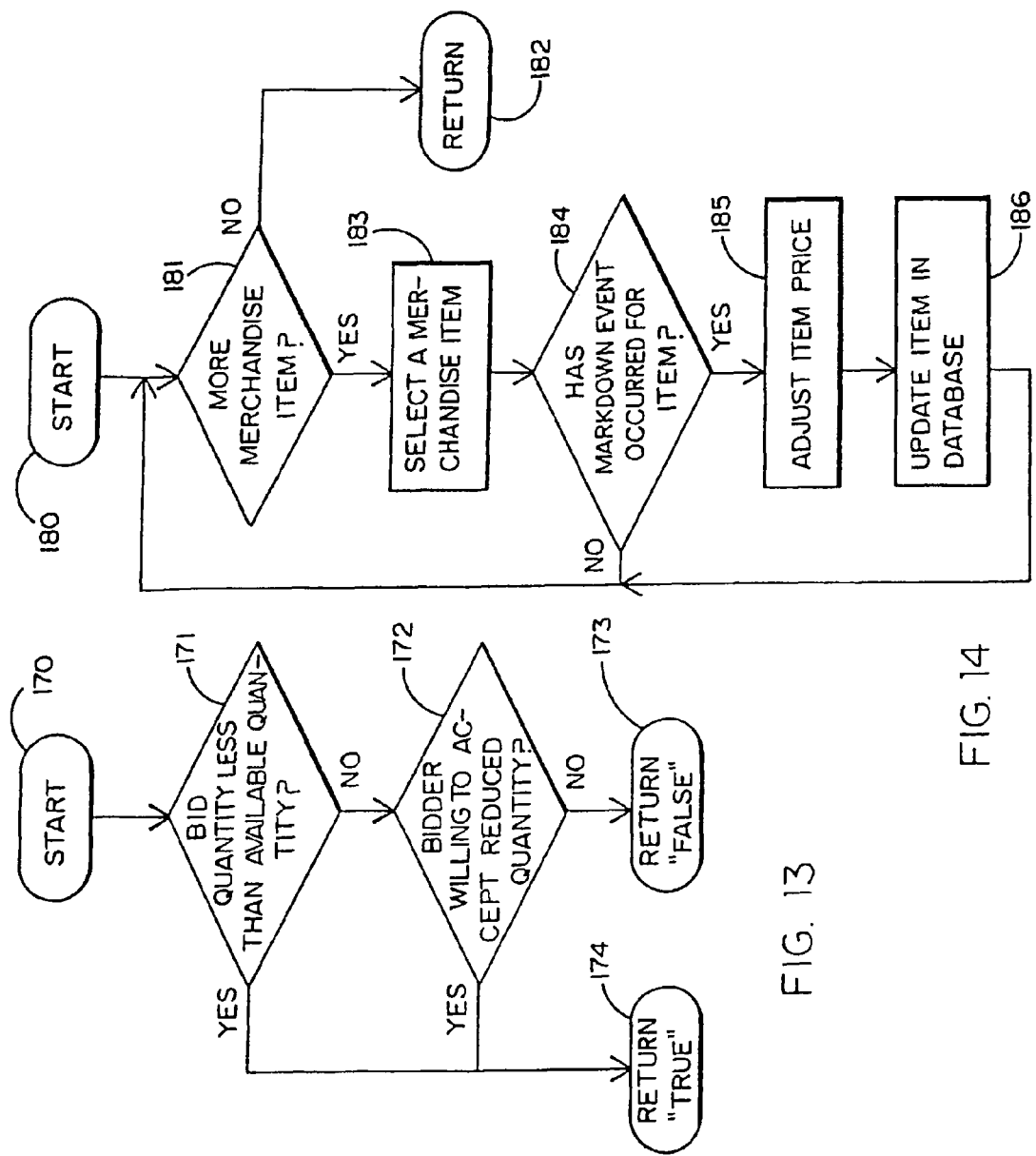

SYSTEM AND METHOD FOR RECEIVING A BID

CROSS-REFERENCE TO RELATED APPLICATIONS

This application is a continuation of U.S. application Ser. No. 10/319,868, filed Dec. 13, 2002, which is a continuation of U.S. application Ser. No. 09/706,849, filed Nov. 7, 2000, which is a continuation of U.S. application Ser. No. 08/624,259 filed Mar. 29, 1996, now issued as U.S. Pat. No. 6,243,691, which applications are incorporated herein by reference.

This application is related to co-pending U.S. application Ser. No. 10/316,296, entitled "Method and System for Offering an Item for Sale Using a User-Selectable Bid Indicia", filed Dec. 10, 2002; U.S. application Ser. No. 10/316,292, entitled "Method and System for Automatically Adjusting a Posted Selling Price", filed Dec. 10, 2002; U.S. application Ser. No. 10/316,325, entitled "Method and System for Performing a Bid Quantity Adjustment", filed Dec. 10, 2002; U.S. application Ser. No. 10/318,676, entitled "Method and System for Performing a Buy or Bid Auction", filed Dec. 13, 2002; U.S. application Ser. No. 10/316,326, entitled "Method and System for Validating a Bid", filed Dec. 10, 2002; U.S. application Ser. No. 10/319,869, entitled "Method and System for Adjusting a Close Time of an Auction", filed Dec. 13, 2002; U.S. application Ser. No. 10/316,324, entitled "Method and System for Performing a Progressive Auction", filed Dec. 10, 2002; U.S. application Ser. No. 10/316,297, entitled "Method and System for Performing Proxy Bidding", filed Dec. 10, 2002; U.S. application Ser. No. 10/316,298, entitled "Method and System for Providing Simultaneous On-Line Auctions", filed Dec. 10, 2002; and U.S. application Ser. No. 10/316,293, entitled "Method and System for Updating Information On a Merchandise Catalog Page", filed Dec. 10, 2002, each commonly assigned with the present invention and incorporated herein by reference.

BACKGROUND OF THE INVENTION

1. Field of the Invention

The present invention relates generally to electronic commerce and more particularly to conducting an interactive auction over an electronic network.

2. Background of the Invention

Auctions usually take the form of a physical gathering of bidders assembled together within an auction house. Interested bidders simply appear at the appointed time and place and bid on merchandise in which they are interested.

BRIEF DESCRIPTION OF THE DRAWINGS

An exemplary embodiment of the present invention is illustrated in the accompanying drawings in which like references include similar elements and in which:

FIG. 2 illustrates an exemplary merchandise catalog page offering an item for sale via electronic auction on the Internet's World Wide Web;

FIG. 3 depicts an exemplary bid form for bidding on an auction item;

FIG. 6 is a flowchart illustrating an exemplary auction manager and its method of operation;

FIG. 8 is a flowchart illustrating an exemplary electronic mail messenger and its method of operation;

FIG. 13 is a flowchart illustrating an exemplary bid quantity determination and its method of operation; and FIG. 14 is a flowchart illustrating an exemplary markdown price adjustment and its method of operation.

DETAILED DESCRIPTION

Figure 1:
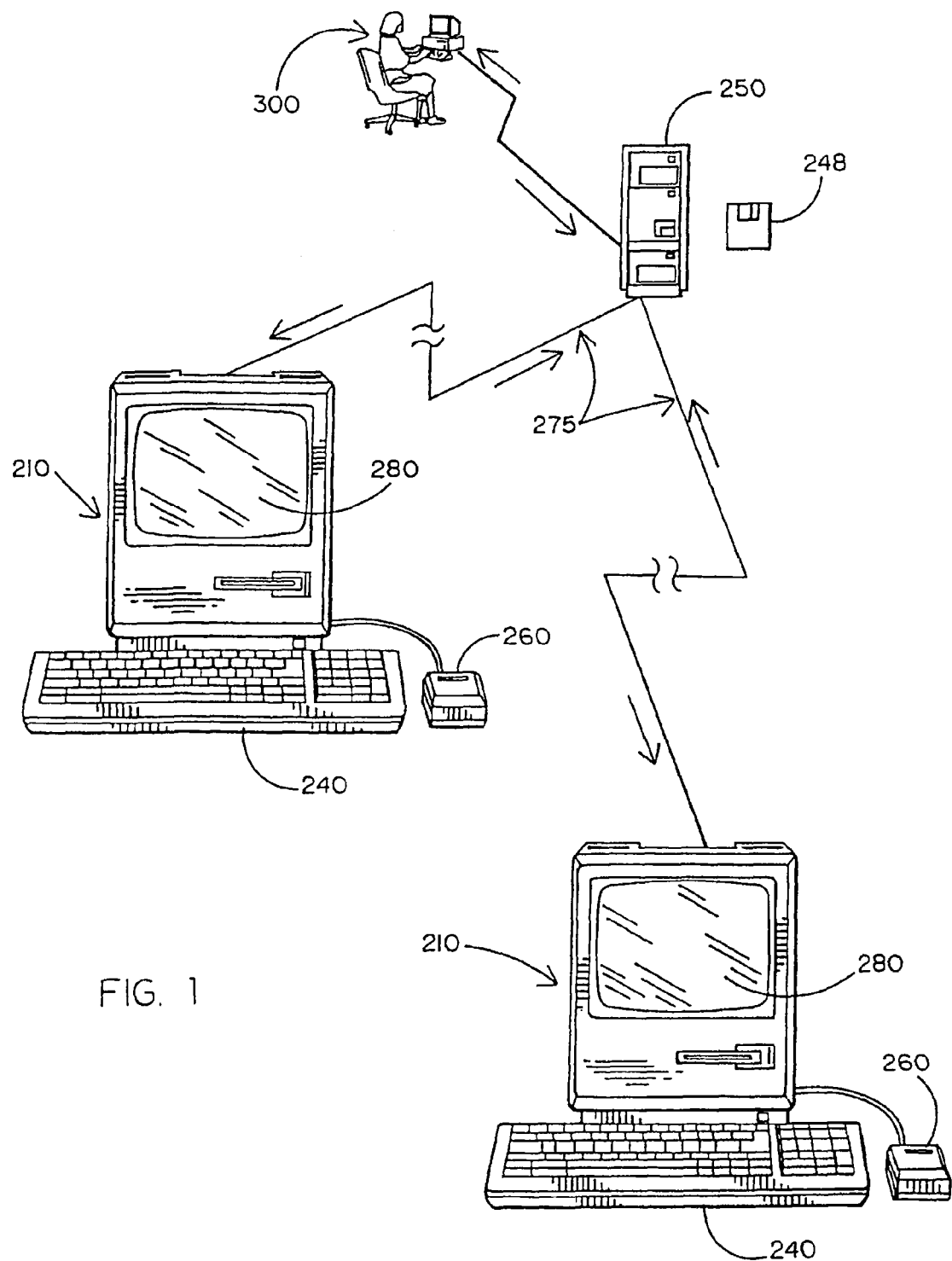
FIG. 1 illustrates an exemplary computer environment for implementing the system and method of the present invention.

A system and method for receiving a bid are described. In the following description, for the purposes of explanation, numerous specific details are set forth in order to provide a thorough understanding of the present invention. It will be evident, however, to one skilled in the art that the present invention may be practiced without these specific details.

An exemplary system includes a database for maintaining descriptions of the merchandise for auction, the bids, and other relevant information in a commercially available database system. Database searches may be performed periodically to check for new items to be made visible to potential bidders. Such periodic searching allows an individual charged with maintaining this system to load relevant information into the database at his or her leisure. Once the database is loaded with information about the item and the item is scheduled for presentation to potential bidders, the system takes the merchandise information and creates a human readable catalog page for a viewing over a public network such as the Internet's World Wide Web. Bidders are then able to view the new item for auction and to place their bids. These catalog pages preferably contain the current high bid, bid increment, quantity available, merchandise description, and picture of the item.

Upon accessing a public network and seeing an item's catalog page, the bidder may press a button on the catalog page or take some similar action which causes a bid form to be displayed on the screen. The bidder then enters the information necessary to place a bid, such as their name and address, bid amount, payment information, etc., and then presses a bid submission button, or takes a similar action which sends the bid to the system.

The system receives the electronic bid information and places it in the bid database. Because this new bid will, in general, be a bid for a higher amount than was last bid by another party, the system will regenerate the item's catalog page. This updated catalog page will then show the new high bid to any prospective bidders who later access that catalog page.

Because most bidders will not, in general, be accessing the network and viewing the merchandise catalog pages as they are updated with new high bids, the system may send electronic mail notifications to bidders who have been outbid by the just-placed bid. These electronic mail notification messages may contain the relevant merchandise information, the current high bid, the bid increment, etc., and encourage the bidder to submit a new and higher bid to outbid the current high bidder. These electronic mail notification messages allow the bidder to enter a new bid by replying to the electronic mail message and sending it back to the system.

Upon receiving a new or revised bid via electronic mail, the system follows the same set of actions as when the bidder places a bid using the electronic bid form when viewing a merchandise catalog page, namely, the system extracts the relevant bid information from the electronic mail message, deposits this information in the bid database, and then updates the merchandise catalog page as appropriate. Such an electronic mail message bid may further cause a new round of electronic mail notifications to go out to the recently outbid bidders.

This process may continue until the system detects that the item is scheduled to be closed for further bidding or another closing trigger is detected. At this point, the system closes the auction by updating the merchandise catalog page with the final winning bid information and by sending electronic mail notifications to both the winning bidder or bidders and the losing bidder or bidders.

The exemplary embodiment of the present invention provides an electronic auction method and system for presenting merchandise for sale at auction to customers over an electronic network, such as the Internet's World Wide Web. Potential customers are presented with a series of descriptive merchandise catalog pages through which they may navigate to find items (lots) of interest. Upon finding a lot of interest, customers may click a button on screen to display a form for placing a bid on the lot. After submitting this bid, the electronic auction system records the bid and updates the lot's merchandise catalog page to show the current high bid or bids and to whom such bids are attributable. When the auction is closed, after a period of no bidding activity, at a predetermined time, or when a desired sales volume is reached, the electronic auction system notifies the winning and losing bidders by electronic mail and posts a list of the winning bidders on the closed lot's merchandise catalog page.

The exemplary embodiment of the present invention may be implemented as a computer program 248 running on a central server host computer 250, shown in FIG. 1, attached to a wide area network 275 accessible by many potential customers through remote terminals 210. An exemplary network for implementing the present invention is the Internet which is accessible by a significant percentage of the world population, although the network may also be a local area or limited area accessible network. Potential customers are presented at screen 280 with merchandise catalog pages, such as the one shown in FIG. 2, generated by merchandise catalog page generator 25 shown in FIG. 4. Each merchandise catalog page includes several action buttons 5 that allow the customer to move from catalog page to catalog page and to place bids using keyboard 240 and pointing device 260. The user may call up an index of available merchandise by pressing button 7 or may return to a central home page by pressing button 9.

By pressing bid button 1 in FIG. 2, the customer is presented with a bid form such as the one shown in FIG. 3. The customer fills out the required information in the bid form and presses "Place Bid" button 2 to send the bid to the electronic auction system for processing. Other equivalent means for submitting a bid could be used, as understood by those skilled in the art to which the present invention pertains.

Figure 4:
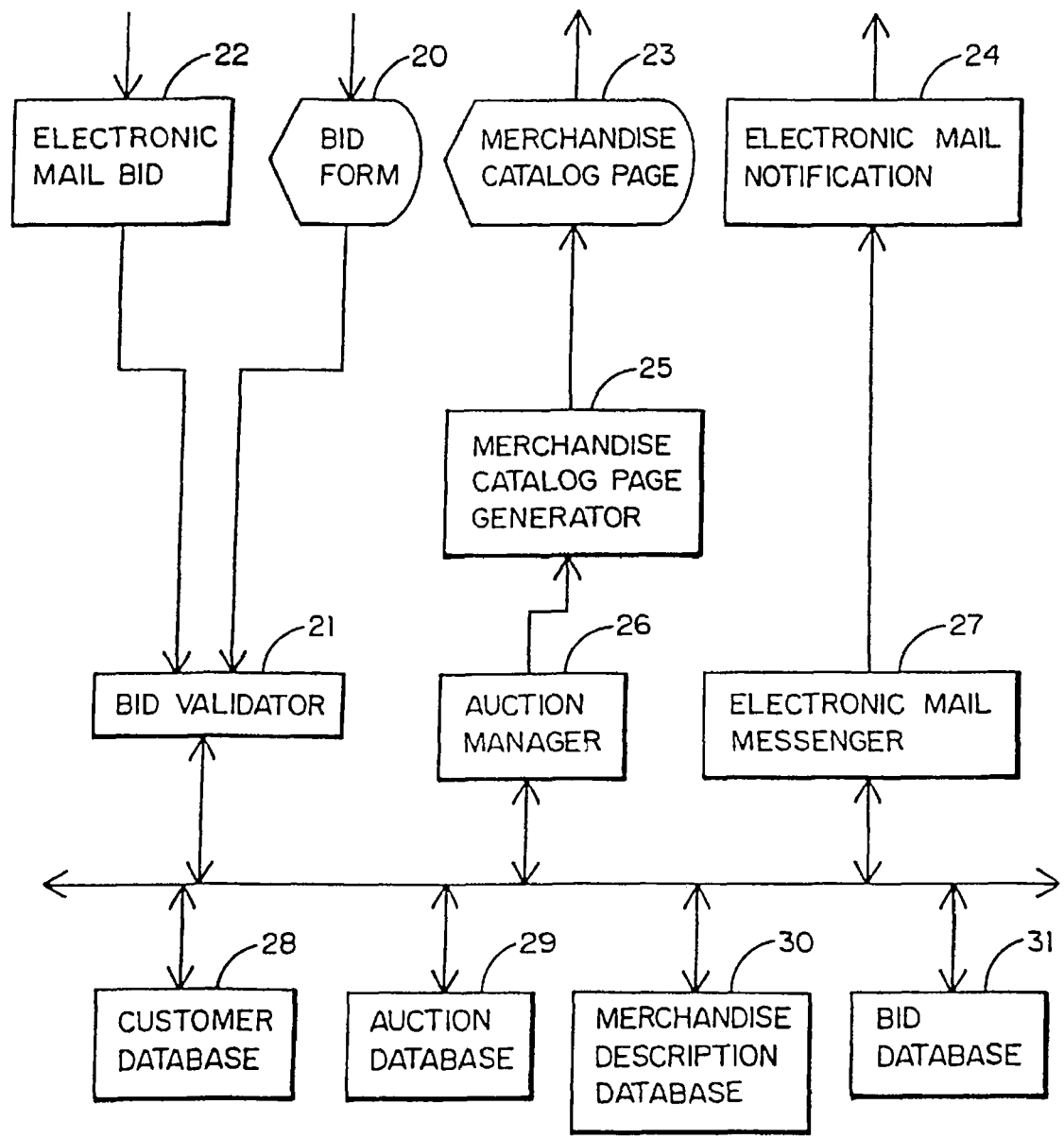
FIG. 4 is a block diagram of components illustrating an exemplary embodiment of the present invention.

FIG. 4 illustrates a high level block diagram of the electronic auction system according to one embodiment of the present invention. As shown, information from bid form 20 is received by the electronic auction system where it is processed by bid validator 21. Bid validator 21 examines the bid information entered by the customer on bid form 20 to ensure that the bid is properly formatted, all necessary data is present, and the data values entered look credible. Exemplary functions of bid validator 21 include verifying credit card information entered by the customer, checking that a complete name and shipping address has been entered, that the proper state abbreviation and zip code have been entered, that an appropriate bid amount has been entered, and that a telephone or facsimile number has been entered. Once the bid information has been validated, the bid validator 21 places the bid in bid database 31.

Auction manager 26 may frequently query the bid database 31 to see if any new bids have been placed. If new bids are found during the query, then auction manager 26 calculates the current high bidder or bidders and instructs merchandise catalog page generator 25 to regenerate a catalog page with the updated bid information.

Auction manager 26 is also responsible for opening and closing auctions. This entails making merchandise lots available for bidding by customers and disabling their associated buy or bid features on the merchandise pages that have been posted to potential bidders but have closed. When auction manager 26 determines that a new lot should be opened for bidding or an available lot should be closed, it instructs merchandise catalog page generator 25 to create or update the merchandise catalog pages for the appropriate lots.

Electronic mail messenger 27 frequently queries bid database 31 for bids recently marked by auction manager 26 as having been outbid or as having won an item in a recently closed auction. If such bids are found, the electronic mail messenger 27 formats an appropriate electronic mail notification message 24 and sends this message to the customer. Many customers read their electronic mail throughout the day, making this a convenient mechanism for keeping them informed about the status of merchandise on which they are actively bidding. Bidders may reply to an electronic mail notification message 24 informing them that they have been outbid by including an increased bid amount in the reply message. An electronic mail bid 22 sent in reply to the notification is received by the electronic auction system and processed by bid validator 21 as described above.

Figure 5:
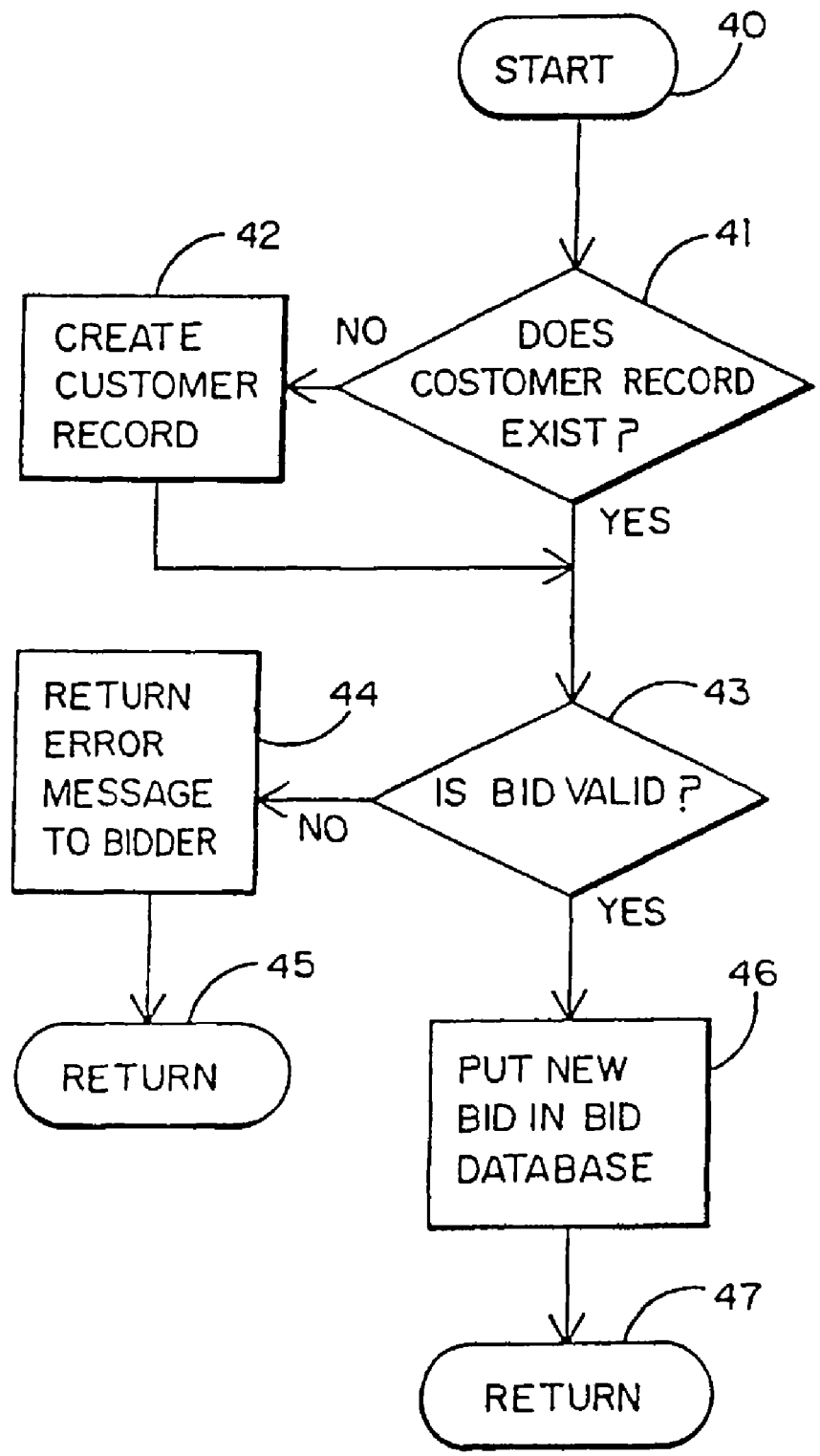
FIG. 5 is a flowchart illustrating an exemplary bid validator and its method of operation.

FIG. 5 illustrates in detail an exemplary procedure of bid validation as accomplished by bid validator 21 shown in FIG. 4. A bid is received by bid validator 21 and the customer is looked up at step 41 in customer database 28. If no customer record exists for the customer then a new customer record is created 42 and placed in customer database 28. From there, the bid information is validated 43 as previously described. If the bid data includes one or more errors, then an error message is returned 44 to the bidder, for example in the form of a well-formatted page posted across the network, itemizing the errors found in the bid. If the bid is valid, as found in step 43, then the bid is placed 46 in bid database 31.

FIG. 6 provides a detailed illustration of exemplary procedures carried out by auction manager 26. Auction manager 26 may be a continuously running system that begins by getting the current time as at step 51. It then checks to see if any new items for sale are to be opened by examining the merchandise database to see if any new merchandise items are scheduled to be made available for bidding by customers at or before the current time. Operator 300, or some automated substitute, may upload merchandise and scheduling information to the database, as shown in FIG. 1. If new merchandise items are scheduled for posting, these items are opened for bidding 52. The auction manager then examines the merchandise database to see if any merchandise items are scheduled to be closed from customer bidding. If so, these items are closed from bidding 53. Auction manager 26 then examines the merchandise database to see if any merchandise items posted with a price markdown feature are scheduled to have their prices adjusted. If so, the prices of these items are adjusted 54 in accordance with the particular item's price adjustment parameters. Such parameters may include bidding activity over time, amount of bids received, and number of items bid for. Auction manager 26 then updates 55 the bid list for open items by recalculating the current high bidder list and regenerating the merchandise catalog pages 56 to reflect these new bids. This step is more fully described below with reference to FIG. 7.

Figure 7:
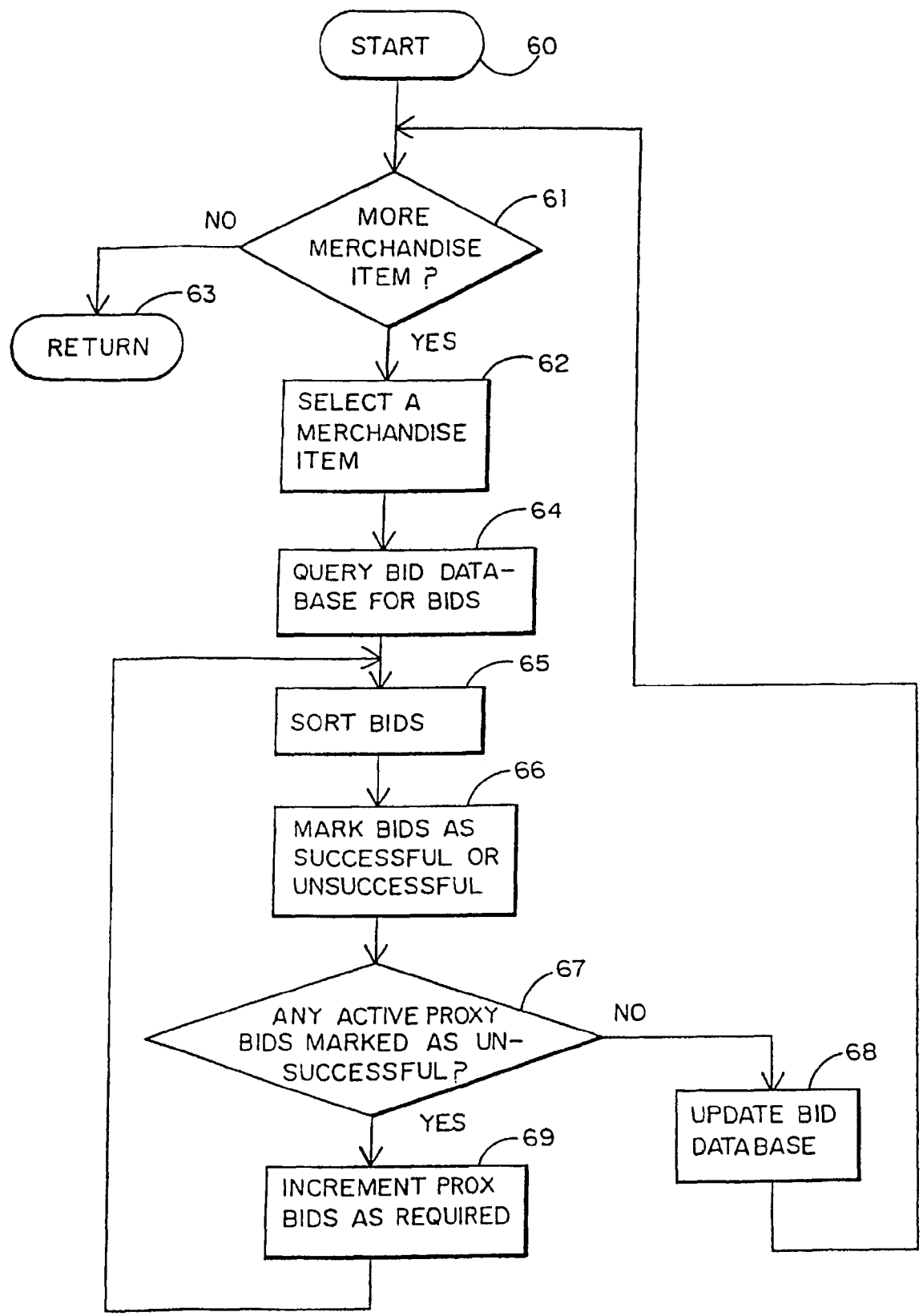
FIG. 7 is a flowchart illustrating an exemplary bid manager and its method of operation.

FIG. 7 illustrates exemplary procedures carried out by the bid manager in updating the bid list for open items 55 as shown in FIG. 6. The bid manager begins by checking 61 if there are more merchandise items to be processed. If such items are found, the bid manager selects 62 a merchandise item to process and queries 64 the bid database for bids for this item. These bids are sorted 65 using a variety of different priority ranking schemes depending upon the auction method and system used for the particular merchandise item, as described in more detail below. Then, the bids are marked 66 as either successful or unsuccessful depending upon the bid price of the respective bids and the quantity of the item being bid on relative to the quantity of the item being auctioned. In an exemplary embodiment, a quantity of an item may be put up for auction, and individual bidders may bid on any quantity of the item desired, up to the quantity of the item being auctioned.

The bid manager then checks 67 to see if there are any active proxy bids marked as unsuccessful. A proxy bid is a special bid type that allows auction manager 26 to automatically bid on the bidder's behalf up to a limited amount established by the bidder when his or her initial bid is placed. The auction manager will increase the bid as necessary up to the limit amount. This feature allows the customer to get the lowest possible price without exceeding a limit preferably established when the bid is entered. If there are active proxy bids marked as unsuccessful, then the bid manager increments 69 the proxy bids by a preset bid increment. This procedure of sorting 65 marking 66 bids and incrementing 69 the proxy bids as required continues until either there are no additional proxy bids marked as unsuccessful or the proxy limits have been reached on the proxy bids. At this point, bid database 31 is updated 68 with the marked bids. This process is then repeated for each merchandise lot open at the current time for bidding by customers.

FIG. 8 illustrates exemplary procedures carried out by electronic mail messenger 27 which notifies bidders when they have been outbid. When marked bids are updated in bid database 31 as shown in FIG. 7, electronic mail messenger 27 detects 81 the presence of these marked bids and then looks up 82 the customer's electronic mail address and looks up 83 inventory information on the item desired by the bidder. With this information, electronic mail messenger 27 constructs 84 an electronic mail message informing the bidder that he or she has been outbid. Once constructed, the electronic mail notification message 24 is sent to the bidder as shown at step 85.

Various components of the electronic auction system can communicate between themselves in a variety of ways. In an exemplary embodiment, bid validator 21, auction manager 26, and electronic mail messenger 27 communicate by adding, marking, and updating records in the various databases. Each of these components periodically checks at least one of the databases to see if anything relevant to their respective functions has changed and take action accordingly. However, the components could send direct messages between themselves or call each other by means of program subroutines to signal important events that would require one or the other component to update its state.

A variety of different auction formats may be implemented using the basic technique described above. The simplest is the "Standard Auction" format, whereby the electronic auction system awards the merchandise to the top bidder or bidders in accordance with their bids once bidding has stopped. Using this format, if there is a plurality of a specific item, the system awards the merchandise to the top bidders. Bidders may bid on more than one unit, and different successful bidders will, in general, pay different prices for an item.

Figure 9:
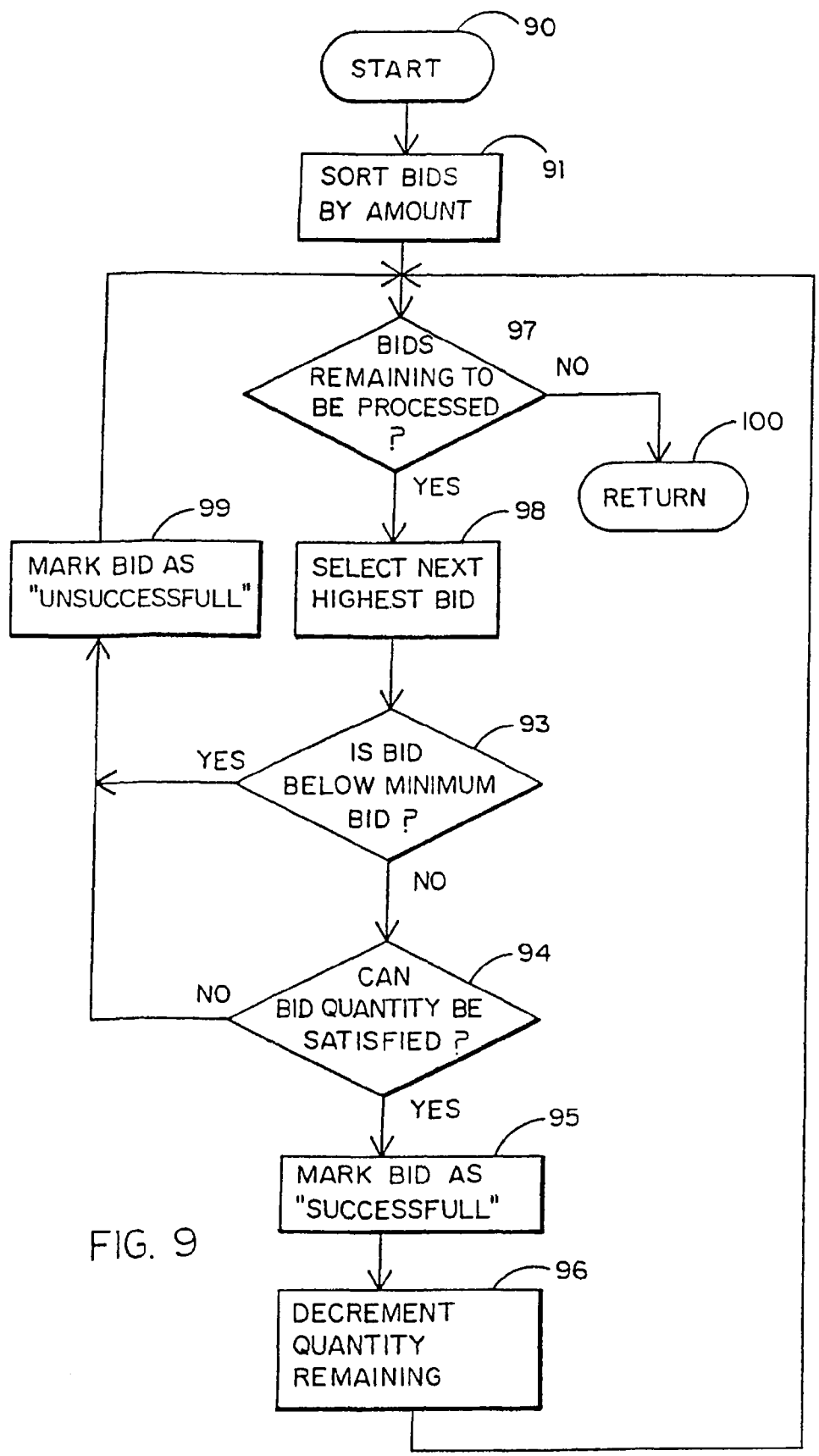
FIG. 9 is a flowchart illustrating an exemplary standard auction format and its method of operation.

FIG. 9 illustrates the exemplary Standard Auction format where bid manager 55, shown in FIG. 6, determines which bids to mark as successful or unsuccessful, as shown in step 66 in FIG. 7. Bid manager 55 begins by sorting 91 the bids by amount of the bid. If there are bids remaining to be processed, determined at step 97, the highest remaining bid is selected 98 to be checked. If the bid is below the minimum bid allowed for the particular merchandise item, as determined at step 93, the bid is marked 99 as unsuccessful. If not, the bid is checked 94 to see if the quantity may be satisfied. A bid may be satisfied if the quantity of the item bid upon is available. This information is available from auction database 29. If not, then the bid is marked 99 as unsuccessful. Optionally, the system could ask the user if a lesser quantity than bid upon will be acceptable, as shown in FIG. 2 at box 310. If the bid quantity can be satisfied, as determined at step 94, then the bid is marked 95 as successful and the item quantity remaining, recorded in auction database 29, is decremented 96 by the bid quantity. After the quantity remaining is decremented 96, and if, as determined at step 97, there are still bids remaining to be marked, the next highest bid is selected 98 and the steps of FIG. 9 are repeated.

The exemplary electronic auction system of the present invention also provides a "Dutch Auction" format, wherein the electronic auction system awards the merchandise to all of the top bidders for whom there is available inventory at the price bid by the lowest successful bidder. This format may be preferred by customers for being the most fair when a plurality of a specific item is being auctioned. As with all bidding, there will be a range of bids submitted. In the Dutch Auction format, the highest bidders are awarded the merchandise but at the same price for all successful bidders, the price bid by the lowest successful bidder.

Figure 10:
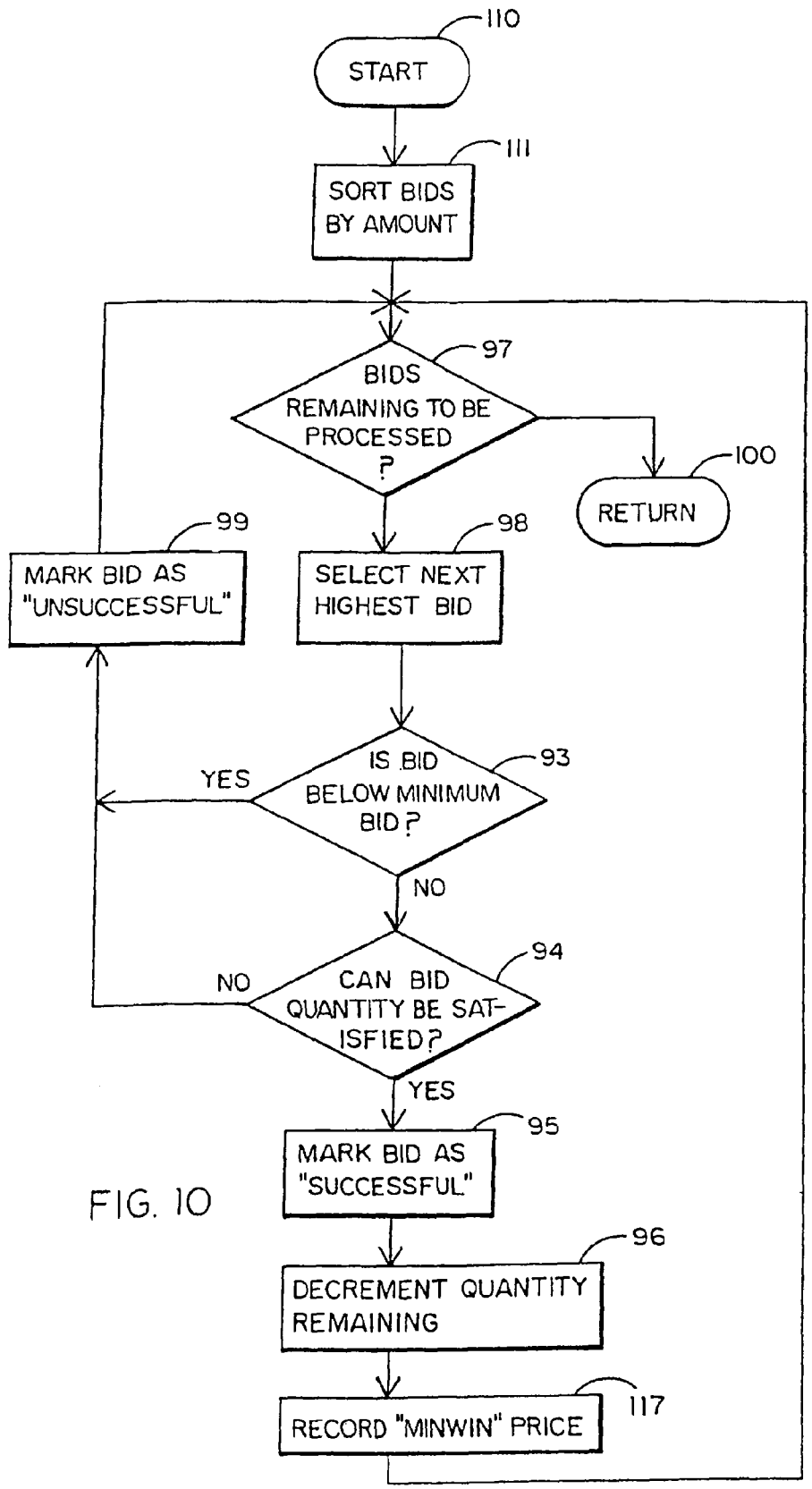
FIG. 10 is a flowchart illustrating an exemplary Dutch auction format and its method of operation.

FIG. 10 illustrates the exemplary Dutch Auction format whereby bid manager 55 shown in FIG. 6 determines which bids to mark 66 as successful or unsuccessful, as shown in FIG. 7. Bid manager 55 begins by sorting 111 the bids by amount of the bid. If there are bids remaining to be processed, as determined at step 97 the highest bid is selected 98 to be checked. If the bid is below the minimum bid allowed for the particular merchandise item, as determined at step 93, the bid is marked as unsuccessful 99. If not, the bid is checked 94 to see if the bid quantity may be satisfied. If the bid cannot be satisfied, then the bid is marked as unsuccessful at step 99. If the bid quantity can be satisfied, then the bid is marked as successful at step 95 and the item quantity remaining is decremented 96 by the bid quantity. At this time the MinWin price is recorded 117. The MinWin price is the price above which a new bidder must bid in order to be successful in the Dutch Auction format were the auction to close at that moment. The MinWin price is, in general, the bid price of the lowest bid that is marked as successful. After recording the MinWin price at step 117, where there are still bids remaining to be marked, as determined at step 97, the next highest bid is selected 98 and the steps of FIG. 10 are repeated.

The exemplary electronic auction system may also include a "Progressive Auction" format, wherein the electronic auction system awards the merchandise to the top bidders based on price bid. As with the Dutch Auction format, the highest price bids are awarded the merchandise up to the quantity available of the item being auctioned. However, unlike the Dutch Auction format, the system awards the merchandise to the successful bidders at different prices depending on the quantity bid. In the exemplary embodiment, a successful bidder for a single unit of an item is awarded the item at the price of the lowest successful bid for a single unit of the item. A successful bidder for a higher quantity of the same item is awarded the item at the price of the lowest successful bid at that quantity or any lower quantity. For example, a successful bidder for a quantity of five would pay the lowest price for any successful bid for quantity one through five of the item. The price paid for a given quantity is termed the "MinWin" price for that quantity. The Progressive Auction format ensures that successful bidders for a quantity of an item pay the lowest price paid by any other successful bidder at that quantity level or below. Use of this format leads to lower prices for those who successfully bid on larger quantities of an item, provides an impetus for volume buying, and therefore leads to greater sales volume.

Figure 11:
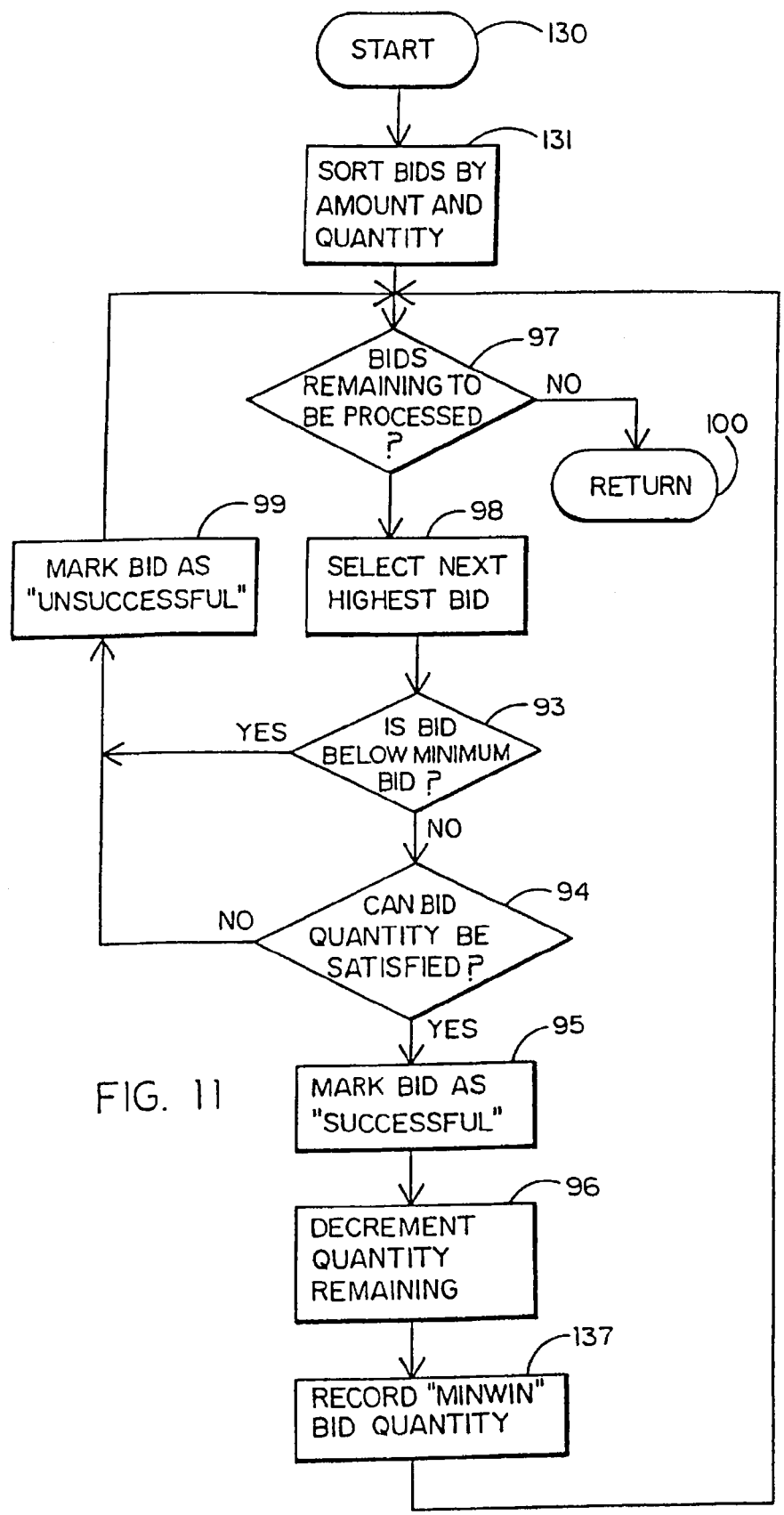
FIG. 11 is a flowchart illustrating an exemplary progressive auction format and its method of operation.

FIG. 11 illustrates the exemplary Progressive Auction format, wherein bid manager 55 shown in FIG. 6 determines which bids to mark as successful or unsuccessful 66 as shown in FIG. 7. Bid manager 55 begins by sorting 131 the bids by amount of the bid. If there are bids remaining to be processed, as determined at step 97, the highest bid is selected 98 to be checked. If the bid is determined to be below the minimum bid allowed for the particular merchandise item at step 93, the bid is marked as unsuccessful 99. If not, the bid is checked at step 94 to see if the bid quantity can be satisfied. If not, then the bid is marked 99 as unsuccessful. If the bid quantity is checked and found to be satisfied at step 94, then the bid is marked as successful 95 and the item quantity remaining is decremented 96 by the bid quantity. The MinWin price is then recorded 137. The MinWin price is the price above which a new bidder must bid in order to be successful in the Progressive Auction format were the auction to close at that moment. The MinWin price is, in general, the bid price of the lowest bid at the current bid quantity or lower that is marked as successful. After recording the MinWin price 137, if there are still bids remaining to be marked, the next highest bid is selected 98 and the steps of FIG. 11 are repeated.

The exemplary electronic auction system may also include a "Buy Or Bid" format wherein the electronic auction system awards merchandise to bidders who place bids at or above a posted selling price. The item remains for sale until the available quantity is purchased. Bids that are below the posted selling price are maintained in reserve by the system. If a certain sales volume is not achieved in a specified period of time, the electronic auction system automatically reduces the price by a predetermined amount or a predetermined percentage of the price and updates the merchandise catalog page accordingly. The lower price may be at or below some of the bids already in the bid database. If such bids are present, they are then converted to orders and the quantity available is reduced accordingly. Similarly, if a certain sales volume is exceeded in a specified period of time, the electronic auction system automatically increases the price by a set amount or by a set percentage of the price and updates the merchandise page accordingly. These automatic price changes allow the seller to respond quickly to market conditions while keeping the price of the merchandise as high as possible to the sellers benefit.

Figure 12:
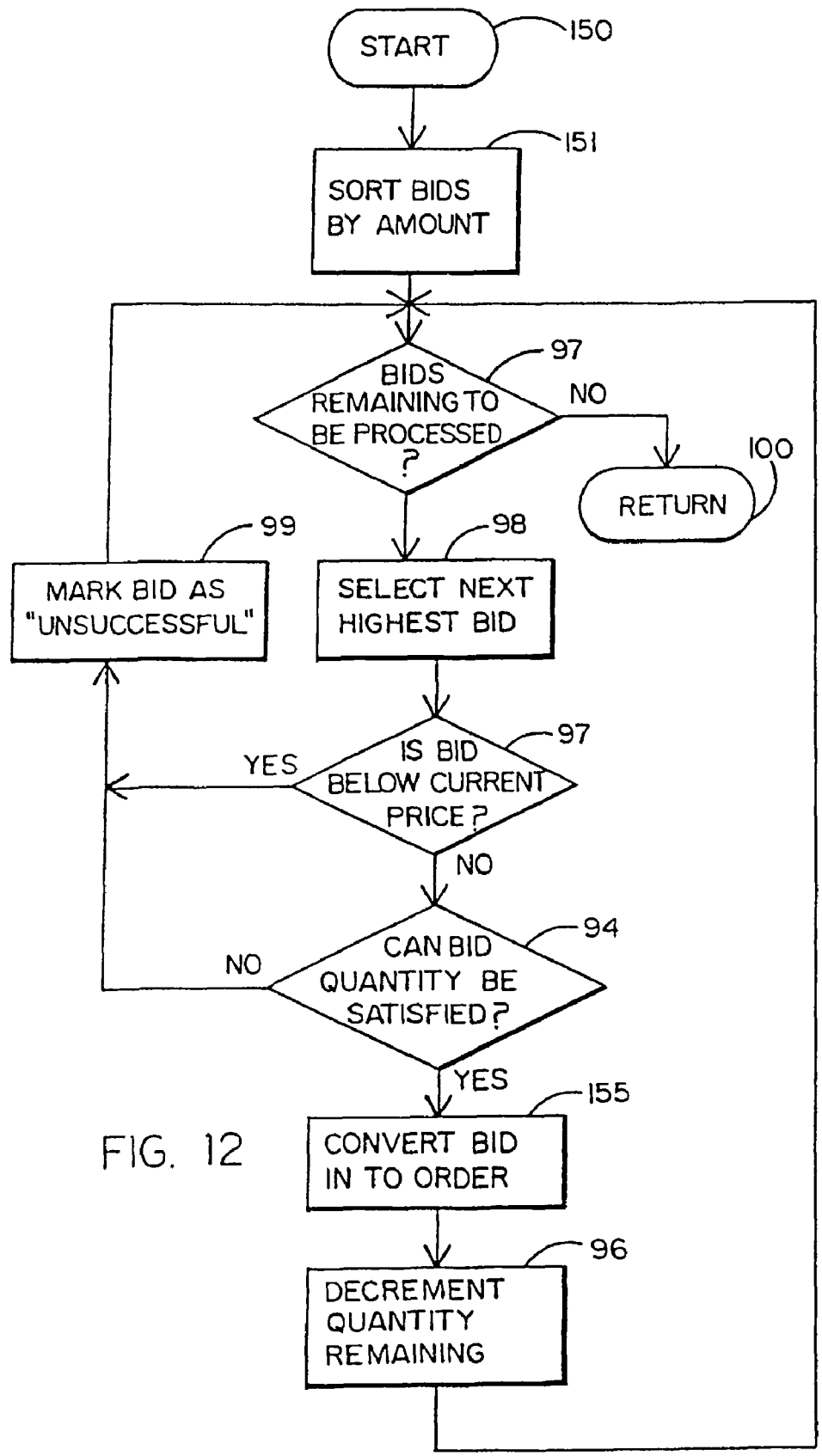
FIG. 12 is a flowchart illustrating an exemplary buy or bid sale format and its method of operation.

FIG. 12 illustrates the exemplary Buy Or Bid format whereby bid manager 55, as shown in FIG. 6, determines which bids to mark as successful or unsuccessful 66, as shown in FIG. 7. Bid manager 55 begins by sorting 151 the bids by amount. If there are bids remaining to be processed, as determined at step 97, the highest bid is selected 98 to be checked. If the bid is below the current price of the merchandise item, as determined at 93, then the bid is marked 99 unsuccessful. If the bid is not below the current price, as determined at 93, then the bid is checked 94 to see if the bid quantity can be satisfied. If not, the bid is marked as unsuccessful 99. If the bid quantity can be satisfied, then the bid is converted into an order 155 at the current price of the item and the item's quantity remaining is decremented 96. The bids remaining to be processed, as determined at 97, are then checked and the steps of FIG. 11 are repeated. From time to time, the current price of the merchandise item may be raised or lowered either by manual input from an operator 300 as shown in FIG. 1 or by automatically using the "markdown" feature described below with reference to FIG. 14.

FIG. 13 illustrates in more detail the step of determining if the bid quantity can be satisfied 94. If the bid quantity is determined to be less than the available quantity of the merchandise item at step 171, then the test is found satisfied at step 174. If not, then the bid is checked at 172 to see if the bidder is willing to accept a reduced quantity. When placing a bid, the bidder indicates its willingness to accept a partial quantity in the event that an insufficient quantity of the item is available to satisfy the bid if successful. If the bidder is found willing to accept a reduced quantity at 172, then the test is found satisfied at 174. If not, the test fails at 173 and the bid is marked as unsuccessful at, for example, 99 in FIG. 9.

The exemplary electronic auction system also includes a "markdown" feature, wherein the electronic auction system awards merchandise to buyers who place orders at the currently posted selling price. The item remains on sale until the available quantity is purchased. If a certain sales volume is not achieved in a specified period of time, the electronic auction system automatically reduces the price by a set amount or a set percentage and updates the merchandise catalog page accordingly. This lower price encourages buyers to take advantage of the new price. If a certain sales volume is exceeded in a specified period of time, the electronic auction system automatically increases the price by a set amount or a set percentage and updates the merchandise page accordingly. These automatic price changes allow the system to respond to market conditions while keeping the prices of the merchandise as high as possible to the seller's benefit.

FIG. 14 illustrates the exemplary Markdown price adjustment feature whereby auction manager 26, as shown in FIG. 4, periodically adjusts 54 the sales prices or minimum bid prices, of the merchandise items according to a predetermined schedule as shown in FIG. 6. If more merchandise items are found in the merchandise database at 181, a merchandise item is selected 183 for Markdown. If a Markdown event has occurred for the item, as determined at 184, the item's price is adjusted 185 according to the schedule preset for the individual item. Alternatively, the adjustment could be relative to prices offered for the merchandise. The merchandise item is then updated 186 in the database with the new sale price or minimum bid price. The steps of FIG. 14 are then repeated for each successive merchandise item in the merchandise database.

The exemplary electronic auction system may include a "Proxy Bidding" feature that may be applied to any of the auction formats described above. FIG. 7 fully describes auction manager 26 including the Proxy Bidding feature. When Proxy Bidding is employed, a bidder places a bid for the maximum amount they are willing to pay. The electronic auction system, however, only displays the amount necessary to win the item up to the amount of the currently high proxy bids of other bidders. Typically, the currently high bids display an amount that is one bidding increment above the second highest bid or bids, although a percentage above the second highest bids may be used as well. When a new bidder places a bid that is above a currently displayed high bid, the proxy feature will, in general, cause the currently high bid to move up to an amount higher than the new bid, up to the maximum amount of the currently high bidder's proxy bid. Once a new bidder places a bid in excess of the currently high bidder's proxy bid, the new bid becomes the current high bid and the previous high bid becomes the second highest bid. This feature allows bidders to participate in the electronic auction without revealing to the other bidders the extent to which they are willing to increase their bids, while maintaining control of their maximum bid without closely monitoring the bidding. Participation is engaged in automatically on the bidder's behalf by the inventive system. The feature guarantees proxy bidders the lowest possible price up to a specified maximum without requiring frequent inquiries as to the state of the bidding.

A variety of different auction formats may be implemented in addition to those described above. The exemplary electronic auction system may, for example, also employ a "Floating Closing Time" feature whereby the auction for a particular item is automatically closed if no new bids are received within a predetermined time interval. This feature would typically be implemented in a manner similar to that used to close auctions of old items, as shown at step 53 in FIG. 6. This feature forces the bidding activity to occur within a shorter amount of time than would otherwise be achieved because bidders are aware that the item will automatically close if no new bids have been received in a timely manner. Thus, bidders have an incentive to stay active in the bidding process to avoid closure of an item before maximum, and most potentially winning, bids have been entered. The Floating Closing Time feature also allows more items to be auctioned during a period of time since each item is closed once bidding activity ceases; the bidding period is not protracted to an artificial length as is the case when an item closes at a preset date and time. The Floating Closing Time feature of the present invention may be employed either in conjunction with or independent of a fixed closing time for an item. When employed in conjunction with a fixed closing time, the auction is closed either when the preset fixed time period has expired for the item or when no bidding activity has occurred within a preset time interval. This forces the bidding to cease at a particular time in case the bidding activity becomes artificially protracted.

Thus, a method and system for providing status updates are disclosed. A general description of the present invention as well as an exemplary embodiment of the present invention has been set forth above. Those skilled in the art to which the present invention pertains will recognize and be able to practice additional variations in the methods and system described which fall within the teachings of this invention. For example, although the exemplary embodiment of the present invention chooses winning bids according to monetary amount included in the bid, preference for bids may also be determined according to time of submission, quantity of merchandise bid for, total bid value, or some other combination of these characteristics. Accordingly, all such modifications and additions are deemed to be within the scope of the invention which is to be limited only by the claims appended hereto.

What is claimed is:

1. A method performed at an electronic auction system that is capable of receiving bid information via electronic mail and via a web-based bid form, the method comprising:
   receiving first bid information via electronic mail and second bid information via the web-based bid form, wherein the first bid information and the second bid information each contain a bid price and a bid quantity;
   validating each of the first and second bid information;
   placing first and second bids in a bid database, the first and second bids being based, respectively on the first and second bid information;
   sorting the first and second bids in an order determined by an auction format used to auction a merchandise item, the auction format selected from a plurality of auction formats when the merchandise item is first listed for auction;
   processing the first and second bids in the sorted order;
   updating a web-based merchandise catalog page based on the processed first and second bids; and
   awarding one or more items from a plurality of items to both a first bidder associated with the first bid and a second bidder associated with the second bid, at different item prices based on the quantity specified in the bid information by each of the first and second bidders.

2. The method of claim 1, wherein the receiving of the first bid information includes receiving an electronic mail including the first bid information in response to an electronic mail notification message requesting a bidder to enter a new or revised bid.

3. The method of claim 1, wherein the receiving of the second bid information is responsive to a bidder entering the second bid information into the web-based bid form and pressing a bid submission button to send the second bid information to the electronic auction system.

4. The method of claim 1, wherein the first and second bid information each include at least one of personal information, willingness to accept a reduced quantity, an account number, an address or an indication of whether to be kept informed of current high bids via electronic mail.

5. The method of claim 1, wherein the validating of each of the first and second bid information includes at least one of ensuring that the first or second bids are properly formatted, ensuring that all necessary data is present or ensuring that data values look credible.

6. The method of claim 1, wherein the updating of the web-based merchandise catalog page includes at least one of updating the web-based merchandise catalog page to indicate at least one current high bidder for an item, updating a high bid amount for the item or updating a high bidder for the item.

\* \* \* \* \*

UNITED STATES PATENT AND TRADEMARK OFFICE
CERTIFICATE OF CORRECTION

PATENT NO. : 8,374,948 B2  
APPLICATION NO. : 11/963094  
DATED : February 12, 2013  
INVENTOR(S) : Fisher et al.

Page 1 of 4

It is certified that error appears in the above-identified patent and that said Letters Patent is hereby corrected as shown below:

On the Title Page

On page 2, in column 2, under "Other Publications", line 2, delete "Yourk, N.Y.: Apr." and insert --York, N.Y., Apr.--, therefor On page 3, in column 1, under "Other Publications", line 42, delete "09/706,849 ," and insert --09/706,849,--, therefor On page 3, in column 1, under "Other Publications", line 64, delete "mailed" and insert --filed--, therefor On page 4, in column 1, under "Other Publications", line 23, delete "mailed" and insert --filed--, therefor On page 4, in column 2, under "Other Publications", line 20, delete "mailed" and insert --filed--, therefor On page 5, in column 1, under "Other Publications", line 58, after "12/710,294", insert --,-- therefor On page 5, in column 1, under "Other Publications", line 71, delete "eBay," and insert --eBay--, therefor On page 5, in column 2, under "Other Publications", line 26-27, delete "Network,," and insert --Network,--, therefor On page 5, in column 2, under "Other Publications", line 57, delete "Wed" and insert --Web--, therefor On page 6, in column 1, under "Other Publications", line 8, delete "Y," and insert --Y.,--, therefor Signed and Sealed this
Seventeenth Day of December, 2013

Margaret A. Focarino
*Commissioner for Patents of the United States Patent and Trademark Office*

On page 6, in column 1, under "Other Publications", line 9, after "Quarterly", insert --,-- therefor On page 6, in column 1, under "Other Publications", line 9, after "No. 3", insert --,-- therefor On page 6, in column 1, under "Other Publications", line 10, delete "J-P," and insert --J.-P.,-- therefor On page 6, in column 1, under "Other Publications", line 12, delete "NY," and insert --N.Y.,-- therefor On page 6, in column 1, under "Other Publications", line 12, delete "29 No. Jan." and insert --29, No. 1, Jan.-- therefor On page 6, in column 1, under "Other Publications", line 18, delete "No. 4,," and insert --No. 4,-- therefor On page 6, in column 1, under "Other Publications", line 20, delete "20." and insert --p. 20-- therefor On page 6, in column 1, under "Other Publications", line 40, delete "E," and insert --E.,-- therefor On page 6, in column 1, under "Other Publications", line 46, delete "Camputer" and insert --Computer-- therefor On page 6, in column 1, under "Other Publications", line 56, delete "A," and insert --A.,-- therefor On page 6, in column 1, under "Other Publications", line 60, delete "G," and insert --G.,-- therefor On page 6, in column 2, under "Other Publications", line 3, after "California", insert --,-- therefor On page 6, in column 2, under "Other Publications", line 7, delete "I," and insert --I.,-- therefor On page 6, in column 2, under "Other Publications", line 18, delete "R," and insert --R.,-- therefor On page 6, in column 2, under "Other Publications", line 27, delete "eBayInc.," and insert --eBay Inc.,-- therefor On page 6, in column 2, under "Other Publications", line 31, delete "C M," and insert --C. M.,-- therefor On page 6, in column 2, under "Other Publications", line 46, delete "J," and insert --J.,-- therefor On page 6, in column 2, under "Other Publications", line 48, delete "S," and insert --S.,-- therefor On page 6, in column 2, under "Other Publications", line 49, delete "Y.: Apr. 29 vol." and insert --Y., Apr. 29, vol.-- therefor On page 6, in column 2, under "Other Publications", line 50, delete "S," and insert --S.,-- therefor On page 6, in column 2, under "Other Publications", line 54, delete "H G," and insert --H. G.,--, therefor On page 6, in column 2, under "Other Publications", line 56, delete "G," and insert --G.,--, therefor On page 6, in column 2, under "Other Publications", line 68, delete "2 pps." and insert --2 pgs.--, therefor On page 7, in column 1, under "Other Publications", line 14, delete "R," and insert --R.,--, therefor On page 7, in column 1, under "Other Publications", line 19, delete "B S," and insert --B. S.,--, therefor On page 7, in column 1, under "Other Publications", line 32, delete "68." and insert --pg. 68.--, therefor On page 7, in column 1, under "Other Publications", line 35, delete "27." and insert --pg. 27.--, therefor On page 7, in column 1, under "Other Publications", line 36, delete "D L" and insert --D. L.--, therefor On page 7, in column 1, under "Other Publications", line 52, delete "T E," and insert --T. E.,--, therefor On page 7, in column 1, under "Other Publications", line 62, delete "B F," and insert --B. F.,--, therefor On page 7, in column 1, under "Other Publications", line 69, delete "J," and insert --J.,--, therefor On page 7, in column 2, under "Other Publications", line 5, delete "merchandisers." and insert --merchandisers--, therefor On page 7, in column 2, under "Other Publications", line 10-11, delete "Communications," and insert --Communications--, therefor On page 7, in column 2, under "Other Publications", line 12, delete "W," and insert --W.,--, therefor On page 7, in column 2, under "Other Publications", line 15, delete "1 Pages." and insert --1 page.--, therefor On page 7, in column 2, under "Other Publications", line 24, delete "Papers.," and insert --Papers,--, therefor On page 7, in column 2, under "Other Publications", line 27, delete "Interne" and insert --Internet--, therefor On page 7, in column 2, under "Other Publications", line 40, delete "E," and insert --E.,--, therefor On page 7, in column 2, under "Other Publications", line 53, after "York" and insert --,--, therefor On page 7, in column 2, under "Other Publications", line 57, delete "A," and insert --A.,--, therefor On page 8, in column 1, under "Other Publications", line 27, delete "3." and insert --3 pgs.--, therefor On page 8, in column 1, under "Other Publications", line 28, delete "Biddling" and insert --Bidding--, therefor On page 8, in column 1, under "Other Publications", line 28, delete "Record." and insert --Record,--, therefor On page 8, in column 2, under "Other Publications", line 1, delete "Filed" and insert --filed--, therefor In the drawings On sheet 2 of 12, fig. 2, insert --310--, therefor On sheet 3 of 12, fig. 3, line 21, delete "Streel" and insert --Street--, therefor On sheet 11 of 12, fig. 12, reference numeral 97, delete "97" and insert --93--, therefor In the Specifications In column 7, line 29, after "amount", insert --and quantity--, therefor In column 8, line 8, delete "99 unsuccessful" and insert --as unsuccessful 99--, therefor In the Claims In column 10, line 19, in Claim 1, delete "based," and insert --based--, therefor